(12) United States Patent
Budziszek et al.

(10) Patent No.: US 12,297,942 B2
(45) Date of Patent: May 13, 2025

(54) BRACE PIPE ATTACHMENT MECHANISM

(71) Applicant: ASC Engineered Solutions, LLC, Portsmouth, NH (US)

(72) Inventors: Bobby Lee Budziszek, Middletown, RI (US); Jordan Cameron Belen, West Warwick, RI (US); Matthew William McNamara, Portsmouth, RI (US)

(73) Assignee: ASC Engineered Solutions, LLC, Oak Brook, IL (US)

( * ) Notice: Subject to any disclaimer, the term of this patent is extended or adjusted under 35 U.S.C. 154(b) by 0 days.

(21) Appl. No.: 18/216,396

(22) Filed: Jun. 29, 2023

(65) Prior Publication Data

US 2023/0392714 A1 Dec. 7, 2023

Related U.S. Application Data

(63) Continuation of application No. 17/406,387, filed on Aug. 19, 2021, now Pat. No. 11,725,751.

(60) Provisional application No. 63/067,532, filed on Aug. 19, 2020.

(51) Int. Cl.
  *F16L 3/14* (2006.01)
  *F16L 3/12* (2006.01)
(52) U.S. Cl.
  CPC .. *F16L 3/14* (2013.01); *F16L 3/12* (2013.01)
(58) Field of Classification Search
  CPC ..... F16L 3/14; F16L 3/12; F16L 3/245; F16L 3/1207; F16B 7/0493
  See application file for complete search history.

(56) References Cited

U.S. PATENT DOCUMENTS

| | | | | |
|---|---|---|---|---|
| 3,436,108 A | * | 4/1969 | Van Buren, Jr. | ...... F16B 5/0685 24/336 |
| 6,227,757 B1 | * | 5/2001 | Delouvee | .............. F16B 7/0493 248/65 |
| 7,294,789 B1 | * | 11/2007 | Watthanasintham | ........................ F16L 3/1215 174/64 |
| 7,455,268 B2 | * | 11/2008 | Heath | .................... F16L 3/1215 248/65 |

(Continued)

FOREIGN PATENT DOCUMENTS

| CA | 2739082 | 11/2011 | | |
|---|---|---|---|---|
| CA | 2739082 A1 | * 11/2011 | ................ F16L 3/04 |

OTHER PUBLICATIONS

Anvil pipe hanger and supports product catalog dated Mar. 2016, https://www.i-c-e-inc.com/ASSETS/DOCUMENTS/ITEMS/EN/Anvil_0500009337_Catalog.pdf (Year: 2016).*

(Continued)

*Primary Examiner* — Eret C McNichols
*Assistant Examiner* — Ding Y Tan
(74) *Attorney, Agent, or Firm* — McAndrews, Held & Malloy, Ltd.

(57) ABSTRACT

A brace pipe attachment mechanism includes a hook member comprising a hook and defining a first fastener hole; a base member defining a second fastener hole aligned with the first fastener hole, wherein the hook member is rotatable relative to the base member between a first position and a second position; and a fastener extending through the first fastener hole and the second fastener hole and configured to engage a brace pipe, wherein the hook member is rotatable about the fastener.

18 Claims, 18 Drawing Sheets

(56) References Cited

U.S. PATENT DOCUMENTS

| | | | | |
|---|---|---|---|---|
| 7,523,895 | B1* | 4/2009 | Kirschner | F16L 3/04 248/65 |
| 7,618,015 | B2* | 11/2009 | Jahnz | E04H 12/2269 224/571 |
| 8,070,113 | B1* | 12/2011 | Kirschner | F16L 3/245 248/65 |
| 8,353,143 | B2 | 1/2013 | Osborn et al. | |
| 8,353,486 | B2 | 1/2013 | Osborn et al. | |
| 8,459,681 | B2* | 6/2013 | Chamberlain | B62J 11/13 248/65 |
| 9,726,304 | B2 | 8/2017 | Heath | |
| 11,725,751 | B2 | 8/2023 | Budziszek et al. | |
| 2009/0183463 | A1* | 7/2009 | Osborn | F16L 3/16 248/62 |
| 2011/0017880 | A1* | 1/2011 | Osborn | F16L 25/08 248/74.1 |
| 2013/0020447 | A1* | 1/2013 | Heath | F16B 2/065 248/58 |
| 2014/0191091 | A1* | 7/2014 | Heath | F16L 3/1211 248/68.1 |
| 2014/0367530 | A1* | 12/2014 | Radzik | F16L 3/1207 248/74.1 |
| 2016/0010764 | A1* | 1/2016 | Dworak, Jr. | F16L 3/1215 248/65 |
| 2019/0137009 | A1* | 5/2019 | Schickling | F16B 2/241 |
| 2022/0010892 | A1* | 1/2022 | Stewart | F16L 3/133 |
| 2022/0057021 | A1 | 2/2022 | Budziszek et al. | |
| 2023/0392715 | A1 | 12/2023 | Budziszek | |
| 2023/0392716 | A1 | 12/2023 | Budziszek et al. | |

OTHER PUBLICATIONS

"Seismic bracing of CPVC pipe" online article from sprinklerage.com dated Aug. 29, 2018, https://www.sprinklerage.com/seismic-bracing-of-cpvc-pipe/ (Year: 2018), 4 pgs.

Budziszek, Bobby Lee; Non-Final Office Action for U.S. Appl. No. 17/406,387, filed Aug. 19, 2021, mailed Oct. 26, 2022, 20 pgs.

Budziszek, Bobby Lee; Notice of Allowance for U.S. Appl. No. 17/406,387, filed Aug. 19, 2021, mailed Mar. 29, 2023, 8 pgs.

Budziszek, Bobby Lee; Requirement for Restriction/Election for U.S. Appl. No. 17/406,387, filed Aug. 19, 2021, mailed Sep. 1, 2022, 8 pgs.

Nvent Caddy; Brochure for Quick Grip Lateral Sway Brace—CSBQG0400EG, publicly available prior to Aug. 19, 2021, 2 pgs.

* cited by examiner

BRACE PIPE ATTACHMENT MECHANISM

CROSS-REFERENCE TO RELATED APPLICATIONS

The present application is a continuation of U.S. application Ser. No. 17/406,387, filed Aug. 19, 2021, which claims the benefit of U.S. Provisional Application No. 63/067,532, filed Aug. 19, 2020, each of which is hereby specifically incorporated by reference herein in its entirety.

TECHNICAL FIELD

This disclosure relates to pipe suspension. More specifically, this disclosure relates to a brace pipe attachment mechanism for securing a brace pipe to a pipe hanger.

BACKGROUND

Pipe hangers for supporting piping above a ground surface are sometimes mounted to brace pipes. Brace pipes can define varying sizes, but many pipe hangers are not adaptable to varying sizes of brace pipes. Furthermore, coupling the pipe hanger to the brace pipe can be complex and time consuming.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a brace pipe attachment device comprising a hook member comprising at least one hook and defining a first fastener hole; a base member defining a second fastener hole, wherein the hook member is rotatable relative to the base member; and a fastener extending through the first fastener hole and second fastener hole and configured to engage a brace pipe.

Also disclosed is a brace pipe attachment mechanism comprising an attachment device defining an attachment device body, the attachment device body comprising: an inner surface defining a brace pipe channel, the inner surface defining a gripping edge at least partially encircling the brace pipe channel; and a base portion, wherein a base fastener hole extends through the base portion to the brace pipe channel; and a fastener extending through the base fastener hole and into the brace pipe channel.

Additionally, disclosed is a brace pipe attachment assembly comprising a pipe hanger configured to cradle piping thereon, the pipe hanger defining a hanger mount, the hanger mount defining a mount fastener hole; a brace pipe attachment device defining a hook, the hook defining a base portion and a brace pipe channel, the base portion mounted on the hanger mount and defining a base fastener hole; and a fastener extending through the each of the mount fastener hole and the base fastener hole and extending into the brace pipe channel.

A method of supporting piping on a brace pipe is also disclosed, the method comprising supporting the piping on a hanger strap of a brace pipe attachment assembly, the brace pipe attachment assembly further comprising a first brace pipe attachment device and a second brace pipe attachment device, the first brace pipe attachment device defining a first brace pipe channel and the second brace pipe attachment device defining a second brace pipe channel; inserting a first pipe end of the of the brace pipe through the first brace pipe channel; and inserting the brace pipe into the second brace pipe channel, wherein: the second brace pipe attachment device is a hook partially encircling the second brace pipe channel and defining an open hook side, the open hook side allowing lateral access to the second brace pipe channel, and inserting the brace pipe into the second brace pipe channel comprises inserting a mid-region of the brace pipe laterally through the open hook side.

Further, disclosed is a brace pipe attachment mechanism comprising a hook member comprising a hook and defining a first fastener hole; a base member defining a second fastener hole aligned with the first fastener hole, wherein the hook member is rotatable relative to the base member between a first position and a second position; and a fastener extending through the first fastener hole and the second fastener hole and configured to engage a brace pipe, wherein the hook member is rotatable about the fastener.

Also disclosed is a brace pipe attachment assembly comprising a pipe hanger configured to cradle piping thereon, the pipe hanger defining a hanger mount, the hanger mount defining a mount fastener hole; a brace pipe attachment device comprising a hook member, wherein the hook member comprises a hook and defines a first fastener hole aligned with the mount fastener hole, and wherein the hook member is rotatable relative to the hanger mount between a first position and a second position; and a fastener extending through the first fastener hole and the mount fastener hole and configured to engage a brace pipe, wherein the hook member is rotatable about the fastener.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
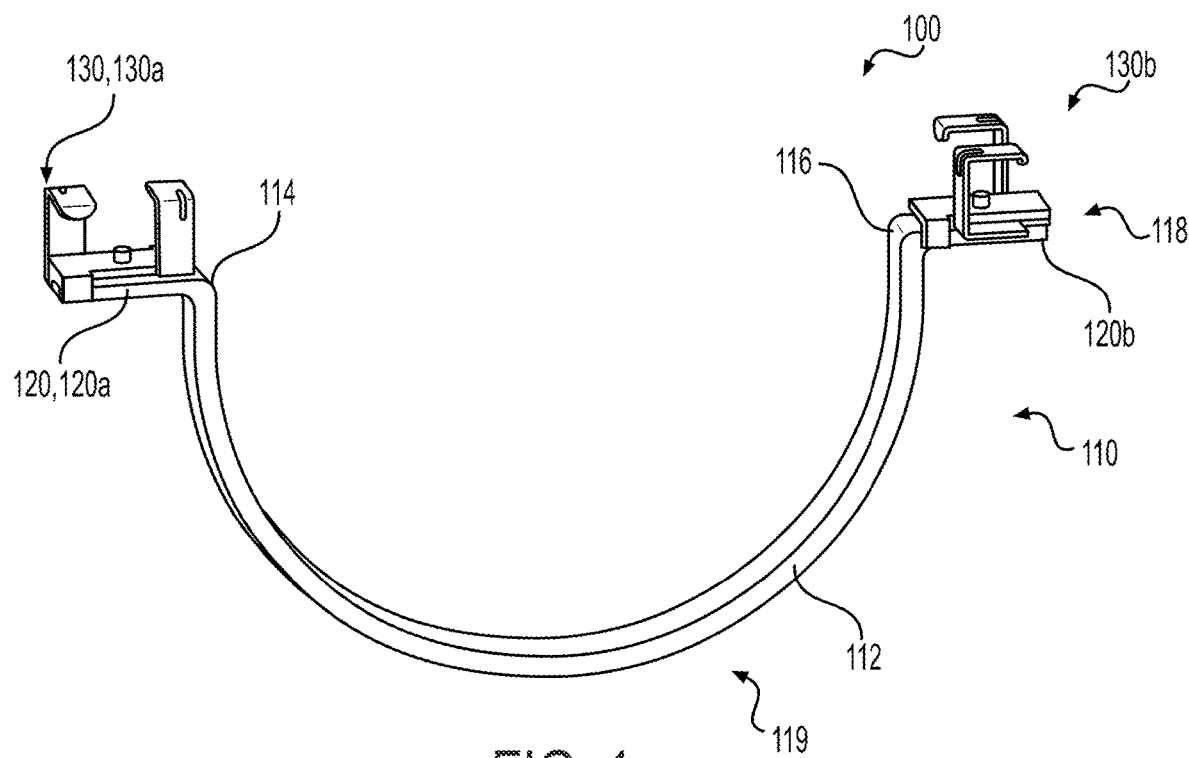
FIG. 1 is a front perspective view of a brace pipe attachment assembly comprising first and second brace pipe attachment devices mounted to a pipe hanger, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a brace pipe attachment device and associated methods, systems, devices, and various apparatus. Example aspects of the brace pipe attachment device can comprise a hook member and a base member. It would be understood by one of skill in the art that the brace pipe attachment device is described in but a few exemplary embodiments among many. No particular terminology or description should be considered limiting on the disclosure or the scope of any claims issuing therefrom.

FIG. 1 is a front perspective view of a first attachment assembly, which can be a brace pipe attachment assembly 100, in accordance with one aspect of the present disclosure. According to example aspects, the brace pipe attachment assembly 100 can be configured to support piping 390 (shown in FIG. 3) above a ground surface. For example, the piping 390 may be suspended from a wall or ceiling of a building structure. Example aspects of the brace pipe attachment assembly 100 can comprise a pipe hanger 110 and one or more brace pipe attachment devices 130 mounted to the pipe hanger 110. As shown, in the present aspect, the brace pipe attachment devices 130 can comprise a first brace pipe attachment device 130a and a second brace pipe attachment device 130b. Other aspects can comprise more or fewer attachment devices 130. In the present view, the first attachment device 130a is oriented in an engaged configured, and the second attachment device 130b is oriented in a disengaged configuration, which are described in further detail below. In example aspects, the brace pipe attachment devices 130 can be formed from a metal material, and in some aspects, the attachment devices 130 can be formed from a sheet metal material, as shown. The sheet metal material can be, for example, steel, aluminum, and the like. In other aspects, the brace pipe attachment devices 130 can be formed from any other suitable material known in the art, including, but not limited to, plastics, composites, and the like.

Example aspects of the pipe hanger 110 can comprise a substantially U-shaped hanger strap 112 configured to cradle a portion of the piping 390. The U-shaped hanger strap 112 can define a first end 114 and a second end 116 opposite the first end 114. Each of the first end 114 and second end 116 can generally be oriented at a top side 118 of the U-shaped hanger strap 112, wherein the top side 118 can be substantially opposite a bottom side 119. The pipe hanger 110 can further comprise a hanger mount 120 extending from each of the first and second ends 114,116 of the U-shaped hanger strap 112. As shown, the first attachment device 130a can be mounted to a first hanger mount 120a and the second attachment device 130b can be mounted to a second hanger mount 120b opposite the first hanger mount 120a. In some aspects, each of the first and second hanger mounts 120a,b can define a mount fastener hole 2010 (shown in FIG. 20) formed therethrough, as will be described in further detail below. In some aspects, the mount fastener hole 2010 can be threaded, while in other aspects, the mount fastener hole 2010 may not be threaded.

Figure 2:
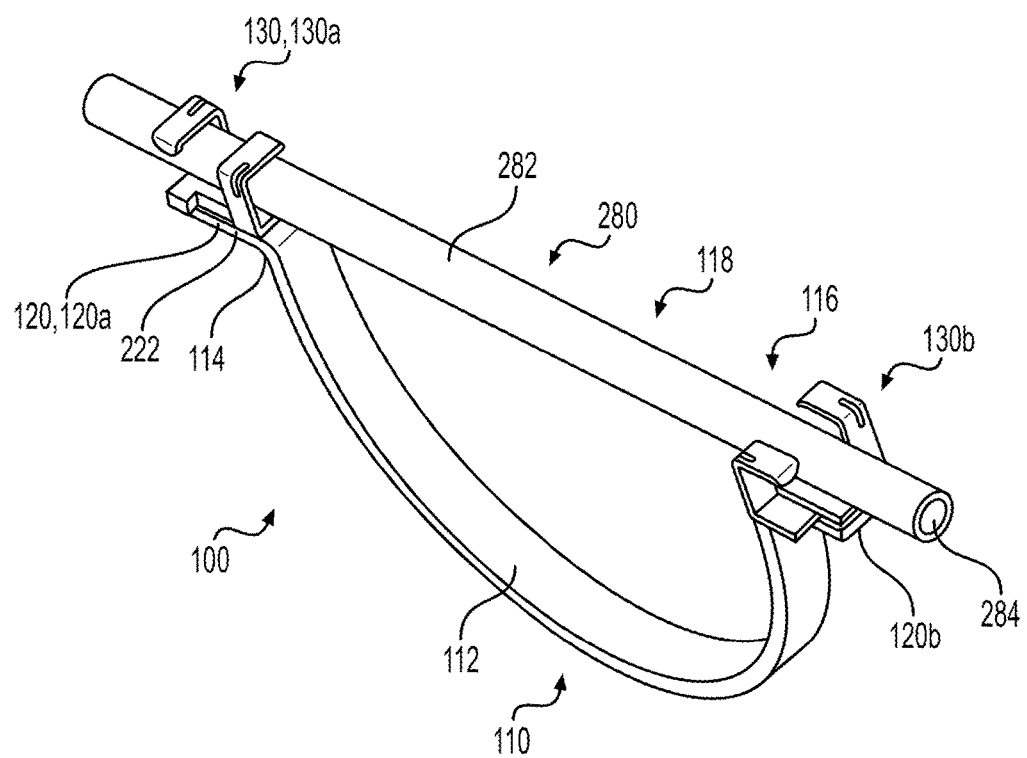
FIG. 2 is a top perspective view the first brace pipe attachment device of FIG. 1 engaging a brace pipe and the second brace pipe attachment device of FIG. 1 disengaged from the brace pipe.
Figure 3:
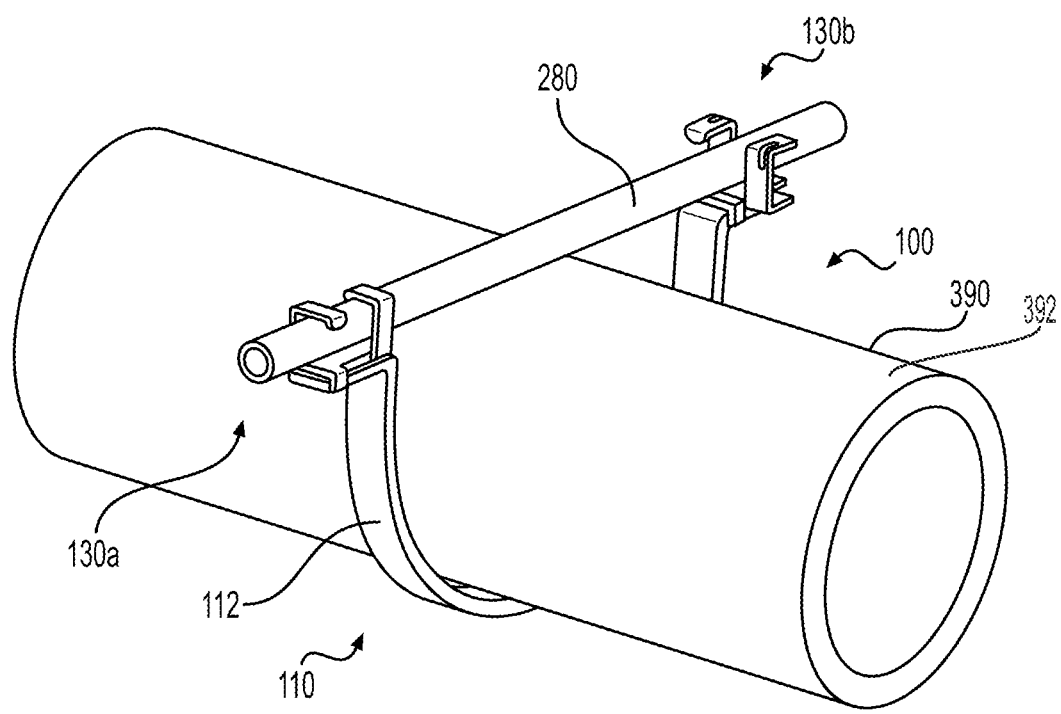
FIG. 3 illustrates a service pipe supported by the brace pipe attachment assembly of FIG. 1, the brace pipe attachment assembly further engaging the brace pipe of FIG. 2.

FIGS. 2 and 3 illustrate a portion of a brace pipe 280 mounted to the brace pipe attachment assembly 100. In example aspects, the brace pipe 280 can extend beyond either side of the illustrated portion, and can be configured to attach to a building structure at a distal end (not shown) thereof. According to example aspects, the distal end of the brace pipe 280 can be attached to the building structure by an I-beam clamp, a wall-mounted bracket, or any other suitable mounting device known in the art. The first attachment device 130a is in the engaged configuration, wherein the first attachment device 130a engages the brace pipe 280 to secure the brace pipe 280 to the brace pipe attachment assembly 100. The second attachment device 130b is in the disengaged configuration, wherein the second attachment device 130b is not engaged with the brace pipe 280, and as such, the brace pipe 280 is not secured to the brace pipe attachment assembly 100 at the location of the second attachment device 130b. As shown, the brace pipe 280 can be configured to extend across the top side 118 of the U-shaped hanger strap 112. The brace pipe 280 can be oriented substantially parallel to each of the first and second hanger mounts 120a,b. That is to say, the brace pipe 280 can be oriented substantially parallel to a first side 222 of each hanger mount 120 and an opposite second side 824 (shown in FIG. 8) of each hanger mount 120. As shown, in some aspects, the brace pipe 280 can extend beyond each of the first and second hanger mounts 120a,b. According to example aspects, the brace pipe 280 can define a substantially tubular shape and can define a substantially cylindrical outer surface 282 and a substantially cylindrical inner surface 284. The brace pipe attachment devices 130 can engage the outer surface 282 of the brace pipe 280 in the engaged configuration to secure the brace pipe 280 to the brace pipe attachment assembly 100. Referring to FIG. 3, the piping 390 can comprise a service pipe 392. The service pipe 392 can be supported by the U-shaped hanger strap 112 below the brace pipe 280, relative to the orientation shown.

Figure 4:
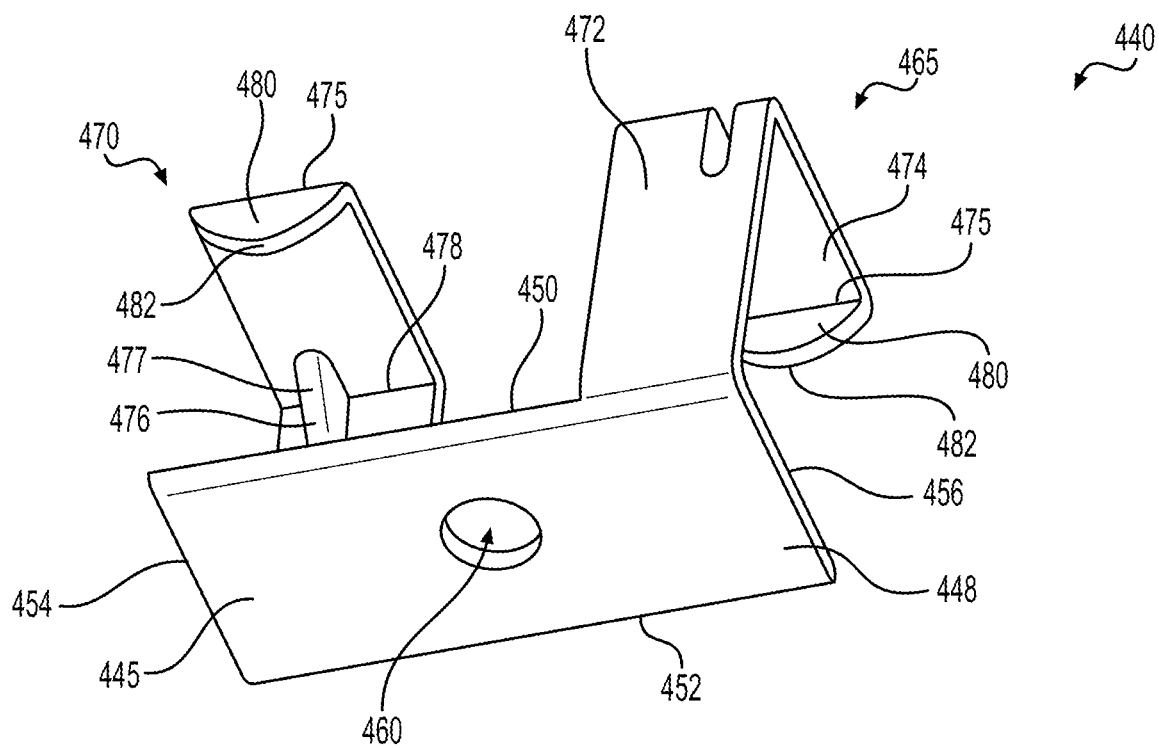
FIG. 4 illustrates a hook member of one of the brace pipe attachment devices of FIG. 1.

As shown in FIG. 4, each of the brace pipe attachment devices 130 (shown in FIG. 1) can comprise a hook member 440. The hook member 440 can define a substantially planar hook support plate 445 and first and second hooks 465,470 extending upward from the hook support plate 445, relative to the orientation shown. The hook support plate 445 can define a top surface 646 (shown in FIG. 6) and a bottom surface 448. According to example aspect, the bottom surface 448 of the hook support plate 445 can be configured to rest on the corresponding hanger mount 120 (shown in FIG. 1) of the pipe hanger 110 (shown in FIG. 1). In example aspects, as shown, a plate fastener hole 460 can be formed through the hook support plate 445. In some aspects, the plate fastener hole 460 can be threaded, while in other aspects, the plate fastener hole 460 can be unthreaded, as shown. Example aspects of the hook support plate 445 can be substantially rectangular in shape, and can generally define a first side 450, a second side 452 opposite the first side 450, a first end 454, and a second end 456 opposite the first end 454. As shown, the first hook 465 can extend upward from the top surface 646, relative to the orientation shown, at the first side 450 of the hook support plate 445, proximate to the second end 456. Furthermore, the second hook 470 can extend upward from the top surface 646, relative to the orientation shown, at the second side 452 of the hook support plate 445, proximate to the first end 454. As described in further detail below, the first and second hooks 465,470 can be sized to accommodate brace pipes 280 (shown in FIG. 2) of varying sizes.

Each of the first and second hooks 465,470 can be substantially L-shaped and can define a leg 472 extending from the hook support plate 445 and substantially perpendicular thereto and an arm 474 extending from the leg 472 distal to the hook support plate 445 and substantially parallel with the hook support plate 445. In some aspects, each of the first and second hooks 465,470 can define a gusset 476 formed at the joint 478 between the corresponding arm 474 and leg 472, wherein the gusset 476 can extend towards the hook support plate 445, as shown.

Example aspects of the gusset 476 can define a substantially triangular shape, as shown. According to example aspects, each of the gussets 476 can define a substantially sharp edge 477. In some aspects, each of the first and second hooks 465,470 can further define a tab 480 extending substantially downward from a distal end 475 of the corresponding arm 474 towards the hook support plate 445. In the present aspect, each tab 480 can be oriented substantially parallel with the corresponding leg 472. Example aspects of the tab 480 can define a pointed tab end 482 distal from the arm 474.

Figure 5:
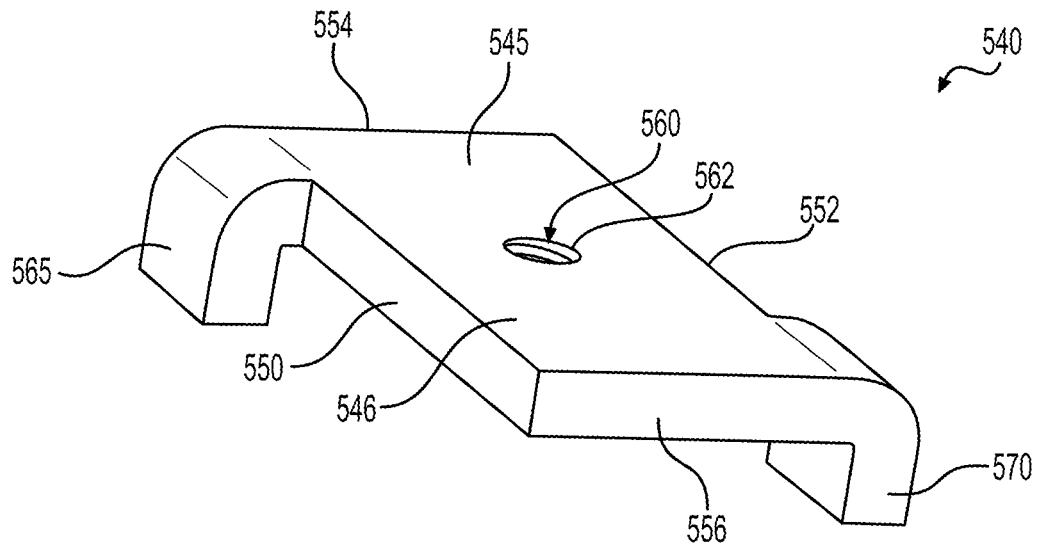
FIG. 5 illustrates a base member of one of the brace pipe attachment devices of FIG. 1.

Referring to FIG. 5, each of the brace pipe attachment devices 130 (shown in FIG. 1) can also comprise a base member 540. Example aspects of the base member 540 can comprise a base support plate 545, and the base support plate 545 can define a top surface 546 and a bottom surface (not shown). The base support plate 545 can further define a first side 550, a second side 552 opposite the first side 550, a first end 554, and a second end 556 opposite the first end 554. As shown, a first stopper 565 can extend substantially downward, relative to the orientation shown, at the first side 550 of the base support plate 545, proximate to the first end 554. A second stopper 570 can extend substantially downward, relative to the orientation shown, at the second side 552 of the base support plate 545, proximate to the second end 556. Example aspects of the base member 540 can define a base fastener hole 560 formed through the base support plate 545, and in some aspects, the base fastener hole 560 can define internal threading 562, as shown.

Figure 6:
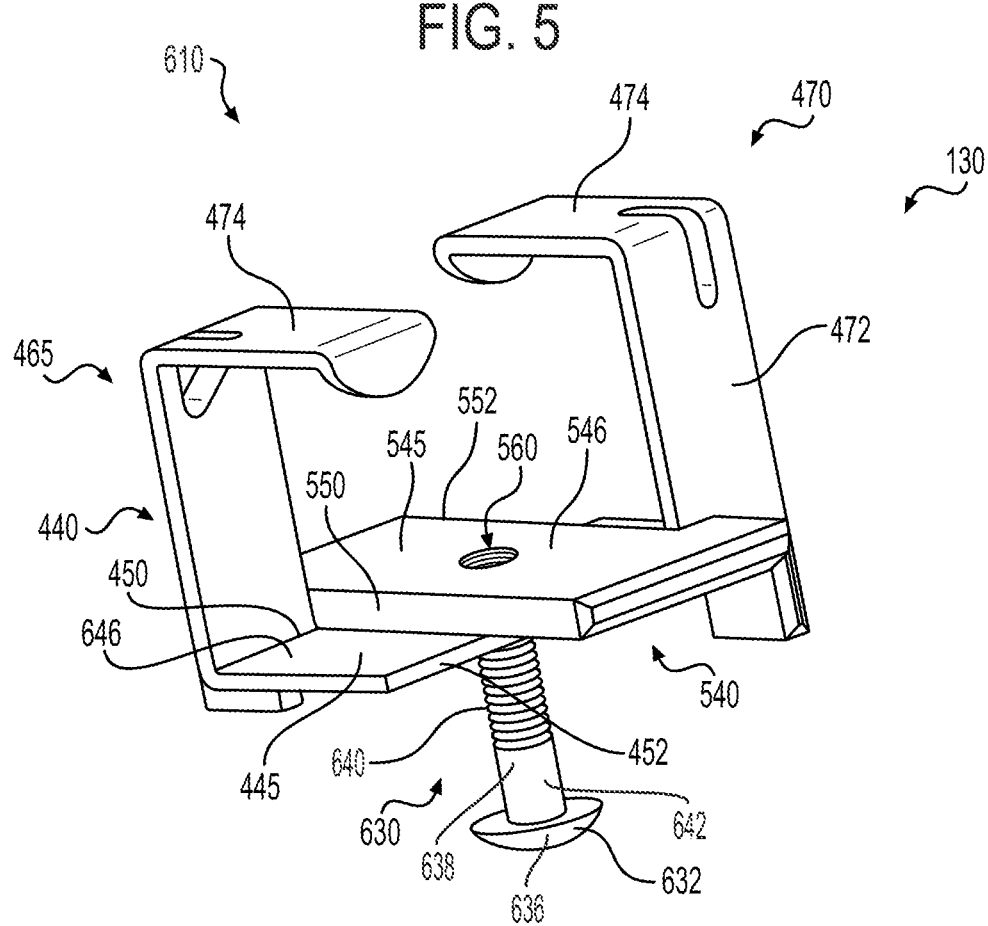
FIG. 6 illustrates the hook member of FIG. 4 assembled with the base member of FIG. 5.

FIG. 6 illustrates one of the brace pipe attachment devices 130 comprising the hook member 440 and the base member 540 in the disengaged configuration. In example aspects, the bottom surface (not shown) of the base support plate 545 of the base member 540 can be configured to rest on the top surface 646 of the hook support plate 445 of the hook member 440. The plate fastener hole 460 (shown in FIG. 4) of the hook member 440 can be aligned with the base fastener hole 560 of the base member 540, and a fastener 630 can be provided for extending through each of the plate and base fastener holes 460,560 to secure the hook member 440 to the base member 540, respectively. The brace pipe attachment device 130 and the fastener 630 can together define a brace pipe attachment mechanism 610. The fastener 630 can be, for example, a screw or a bolt, and can define a head 636 and a shaft 638 extending from the head 636. In some aspects, the fastener 630 can be a set screw 632, as shown. In the present aspect, the shaft 638 of the fastener 630 can define a threaded portion 640 configured to engage the internal threading 562 (shown in FIG. 5) of the base fastener hole 560 of the base member 540. In some aspects, the threaded shaft 638 can further define an unthreaded portion 642 extending between the threaded portion 640 and the head 636. In the disengaged configuration, the hook member 440 can be rotated relative to the base member 540 such that the first and second sides 450,452 of the hook member 440 can oriented substantially perpendicular to the first and second sides 550,552 of the base member 540. In this configuration, the arms 474 of the first and second hooks 465,470 can be oriented such that they do not extend over the base support plate 545.

Figure 7:
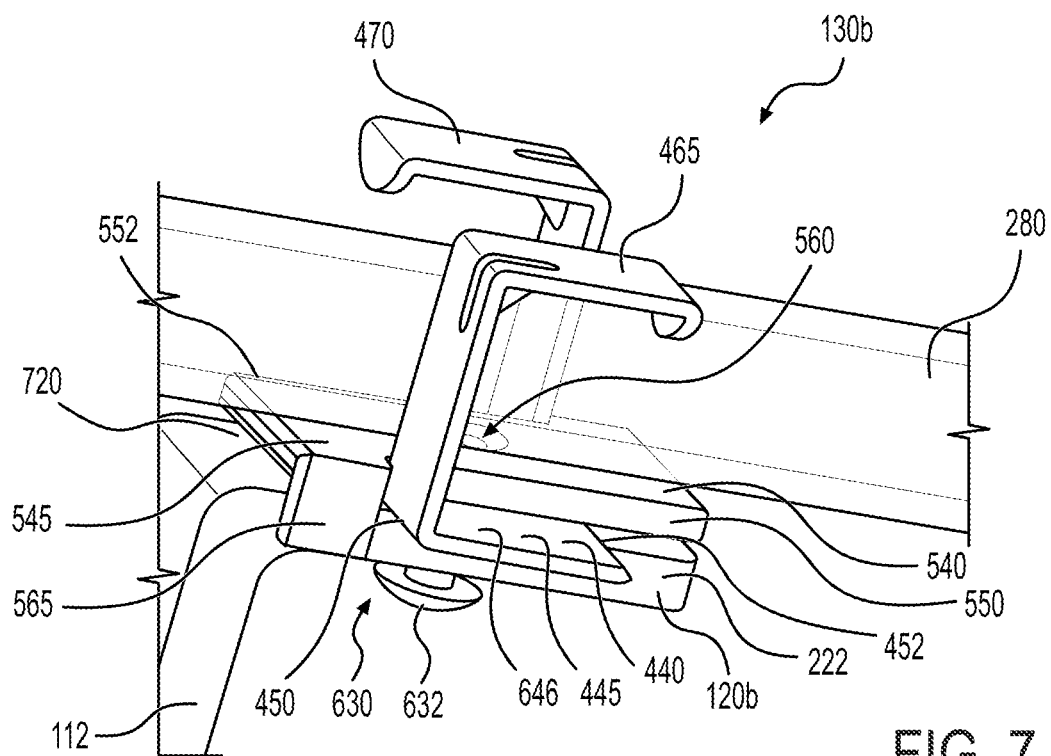
FIG. 7 illustrates a first step in securing the brace pipe of FIG. 2 to the pipe hanger of FIG. 1, wherein the second brace pipe attachment device of FIG. 1 disengaged from the brace pipe.

FIG. 7 illustrates a first step in securing the brace pipe 280 to the pipe hanger 110. A close-up view of the second attachment device 130b is shown as an example, and can also be representative of the first attachment device 130a (shown in FIG. 1). As shown, the second attachment device 130b can be mounted to the corresponding second hanger mount 120b, and the brace pipe 280 can be positioned on the base support plate 545 of the second attachment device 130b. As shown, the second attachment device 130b can initially be disengaged from the brace pipe 280 (i.e., in the disengaged configuration). The brace pipe 280 is illustrated as transparent in the current view for visibility of the second attachment device 130b. As shown, the second attachment device 130b comprises the hook member 440 and the base member 540. The bottom surface 448 (shown in FIG. 4) of the hook support plate 445 can abut an upper surface 720 of the second hanger mount 120b, and the bottom surface (not shown) of the base support plate 545 can abut the top surface 646 of the hook support plate 445. The fastener 630 (e.g., the set screw 632) can extend through the mount fastener hole 2010 (shown in FIG. 20) formed through the second hanger mount 120b and can further extend through the plate and base fastener holes 460,560 formed in the hook member 440 and base member 540 (plate fastener hole 460 shown in FIG. 4) to secure the second attachment device 130b to the second hanger mount 120b.

In example aspects, the first and second stoppers 565,570 (second stopper 570 shown in FIG. 5) can engage the corresponding first and second sides 222,824 (second side shown in FIG. 8) of the second hanger mount 120b to prohibit rotation of the base member 540 relative to the second hanger mount 120b. As described above, in the disengaged configuration, the first and second sides 450,452 of the hook member 440 can oriented substantially perpendicular the first and second sides 550,552 of the base member 540. Furthermore, in the disengaged configuration, the brace pipe 280 can be oriented substantially parallel to the first and second sides 550,552 of the base member 540 and substantially perpendicular to the first and second sides 450,452 of the hook member 440, such that first and second hooks 465,470 do not extend over the brace pipe 280.

Figure 8:
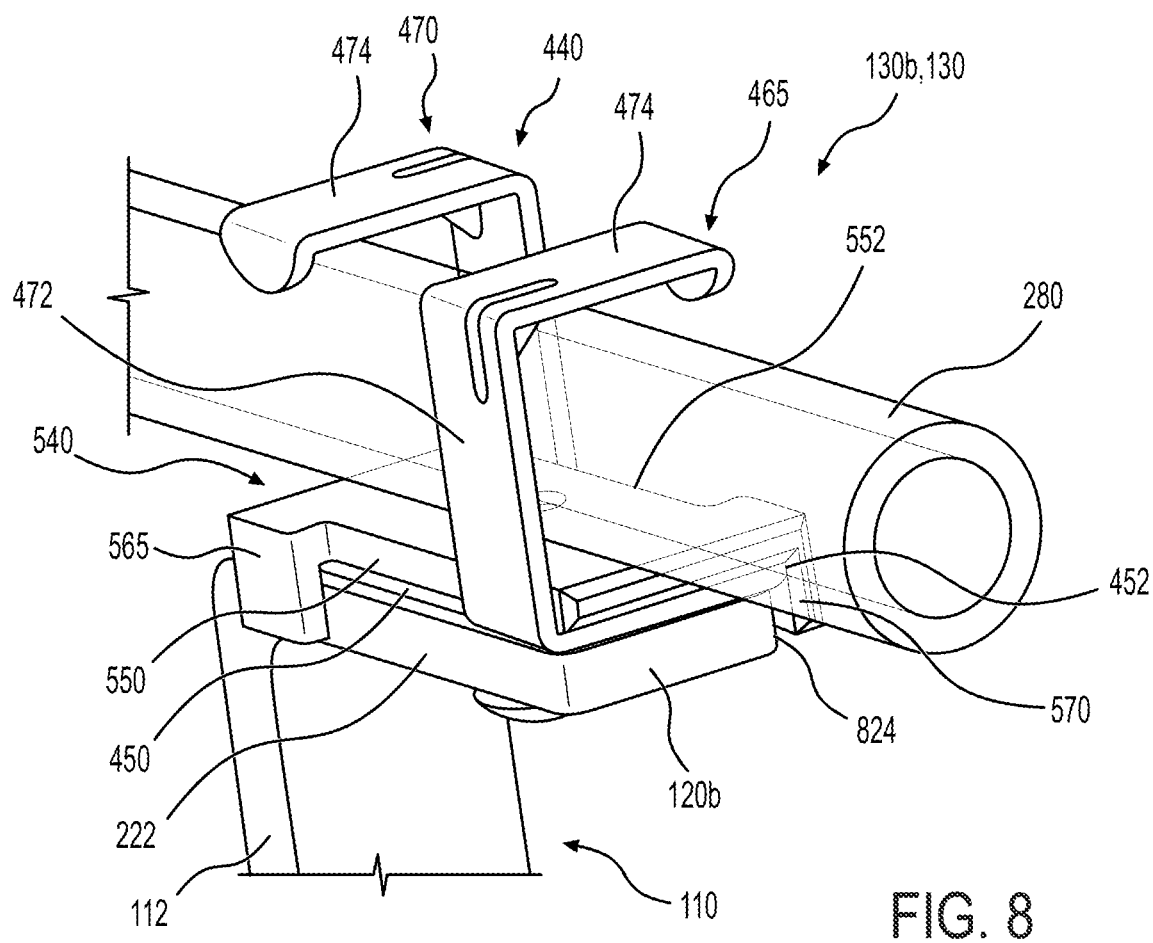
FIG. 8 illustrates a second step in securing the brace pipe of FIG. 2 to the pipe hanger of FIG. 1 with the second brace pipe attachment device of FIG. 1.

FIG. 8 illustrates a second step in engaging the second attachment device 130b with the brace pipe 280 to secure the brace pipe 280 to the pipe hanger 110 at the second attachment device 130b. As shown, the hook member 440 can be rotated approximately 90° relative to the base member 540, such that the first and second sides 450,452 of the hook member 440 can be oriented substantially parallel with the first and second sides 550,552 of the base member 540. In other aspects, the hook member 440 may be configured to rotate more or less than 90° relative to the base member 540. As the hook member 440 rotates, the first and second stoppers 565,570 can prevent the base member 540 from rotating relative to the second hanger mount 120b, as described above. Once the hook member 440 has been rotated about 90° (or more or less in other aspects), the first and second sides 450,452 of the hook member 440 can be oriented substantially parallel with the first and second sides 550,552 of the base member 540, and the first and second sides 450,452 of the hook member 440 can engage the first and second stoppers 565,570, respectively, to prohibit further rotation of the hook member 440. As shown, the corresponding arms 474 of the first and second hooks 465,470 can extend over the brace pipe 280 in this rotated orientation. According to example aspects, the attachment devices 130 can be configured to accommodate brace pipes 280 of varying sizes. For example, as shown, in the present aspect, the brace pipe 280 can define a relatively small diameter. Clearance can be provided between the brace pipe 280 and each of the legs 472, arms 474, and tabs 480 of the first and second hooks 465,470, such that a brace pipe 280 having a larger diameter could be also accommodated by the second attachment device 130b. The present attachment device 130b could also accommodate brace pipes 280 of even smaller diameters.

Figure 9:
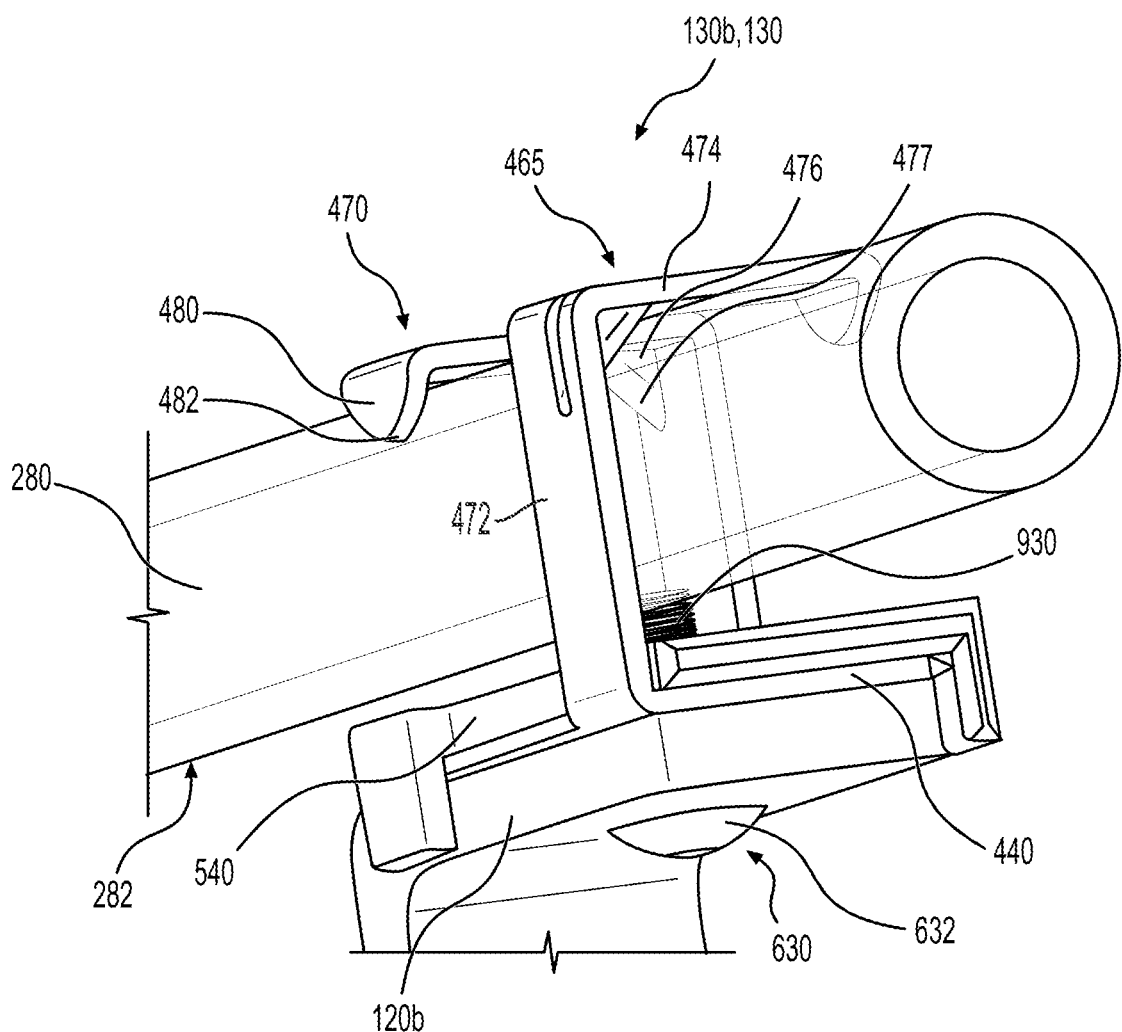
FIG. 9 illustrates a third and final step in engaging the second brace pipe attachment device of FIG. 1 with the brace pipe of FIG. 2 to secure the brace pipe to the pipe hanger of FIG. 1.

FIG. 9 illustrates a third and final step in engaging the second attachment device 130b with the brace pipe 280. As shown, the fastener 630 (e.g., the set screw 632) can be tightened within the corresponding plate and base fastener holes 460,560 formed in the second hanger mount 120b, hook member 440, and base member 540 (plate fastener hole 460 shown in FIG. 4, base fastener hole 560 shown in FIG. 5, and mount fastener hole 2010 formed in the second hanger mount 120b shown in FIG. 20). As the fastener 630 is tightened, an end portion 930 of the fastener 630 can extend through the base fastener hole 560 of the base member 540 and can engage the brace pipe 280. The engagement of the fastener 630 with the brace pipe 280 can bias the brace pipe 280 upward toward the arms 474 of the first and second hooks 465,470. In example aspects, the fastener 630 can be tightened until the brace pipe 280 abuts the arms 474 of the first and second hooks 465,470 and/or until the gussets 476 and the tabs 480 of the first and second hooks 465,470 engage the outer surface 282 of the brace pipe 280. In some aspects, the sharp edges 477 of the gussets 476 and pointed tab ends 482 of the tabs 480 can be configured to dig into the outer surface 282 of the brace pipe 280 to sufficiently grip the brace pipe 280 to secure the brace pipe 280 in place between the first and second hooks 465,470 and the fastener 630.

Thus, once the brace pipe 290 has been positioned on the second attachment device 130b the method for coupling the brace pipe attachment assembly 100 (shown in FIG. 1) to the brace pipe 280 can be a quick and easy process comprising just two steps—rotating the hook member 440 relative to the base member 540 and tightening the fastener 630 against the brace pipe 280. The same method can be used for engaging the first attachment device 130a (shown in FIG. 1) with the brace. An additional benefit as described above, is that the brace pipe attachment devices 130 can be configured to accommodate varying sizes of brace pipes 280. Moreover, to disengage the brace pipe 280 from the brace pipe attachment assembly 100, the method can be completed in reverse. The fastener 630 can be loosened to disengage from the brace pipe 280, and the hook member 440 can be rotated back to the disengaged configuration, as shown in FIG. 7.

Figure 10:
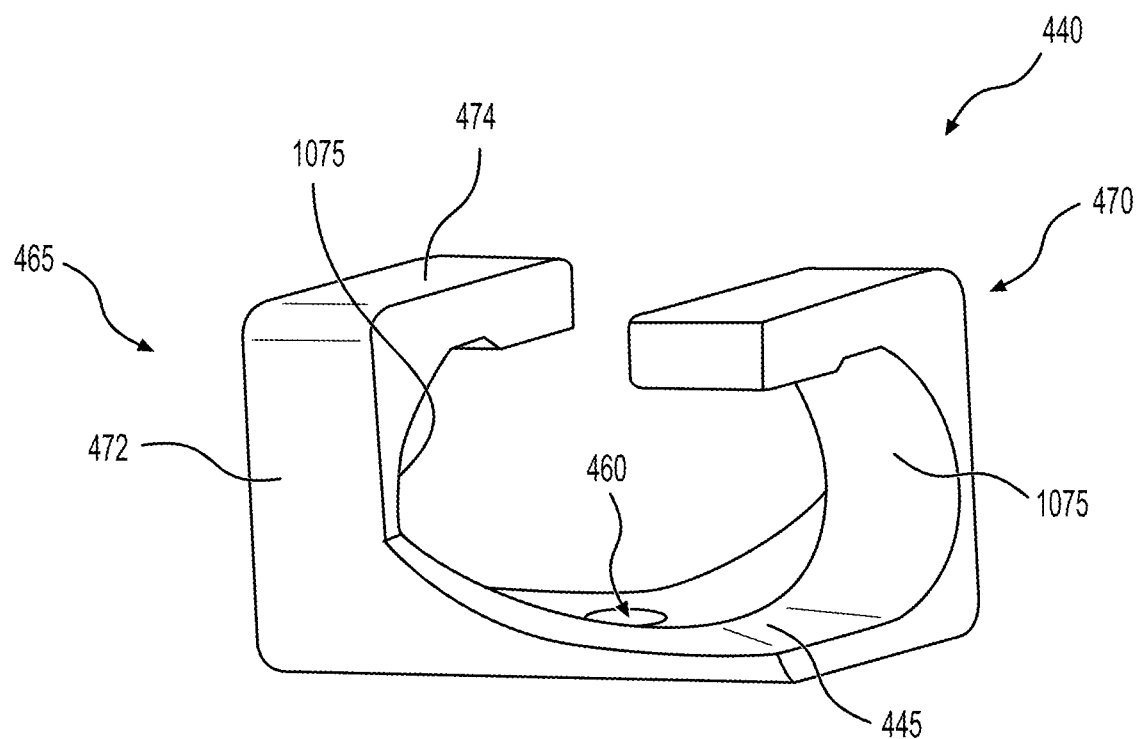
FIG. 10 illustrates a perspective view of the brace pipe attachment device according to another aspect of the present disclosure.
Figure 11:
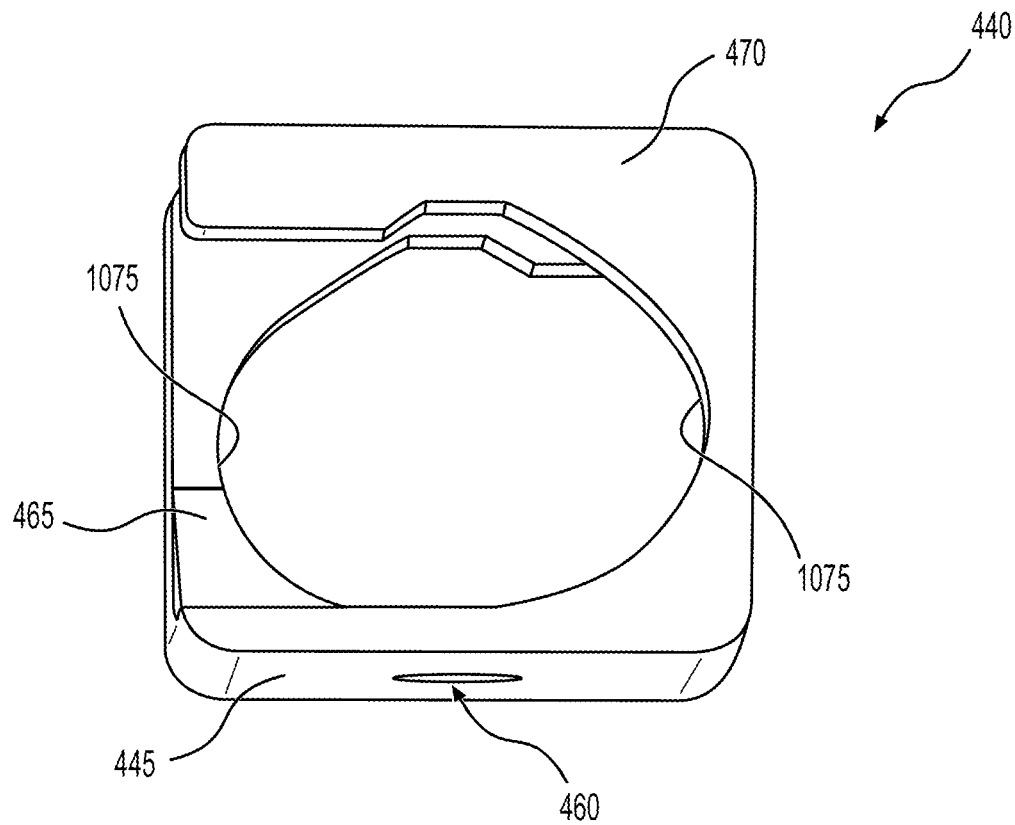
FIG. 11 illustrates a front view of the brace pipe attachment device of FIG. 10.

FIGS. 10 and 11 illustrate perspective and front views, respectively, of the hook member 440 of the brace pipe attachment device 130 (shown in FIG. 1) according to another example aspect of the present disclosure. In example aspects, the brace pipe attachment device(s) 130 can be formed from a metal material, and in the present aspect, the attachment devices 130 can be formed from cast metal. The cast metal material can be, for example, iron, aluminum, and the like. In other aspects, the brace pipe attachment device(s) 130 can be formed from any other suitable material known in the art, including, but not limited to, plastics, composites, and the like. As shown, the hook member 440 can define the hook support plate 445 and the first and second hooks 465,470 extending therefrom. In the present aspect, each of the first and second hooks 465,470, or a portion thereof, can define an arcuate profile 1075 that can allow the attachment device 130 to accommodate various sizes of brace pipes 280 (shown in FIG. 2) and varying load requirements. In some aspects, the base member 540 (shown in FIG. 5) can be monolithically formed with the hook member 440 (i.e., formed as a singular component) for ease of casting and/or to reduce the number of components required.

Figure 12:
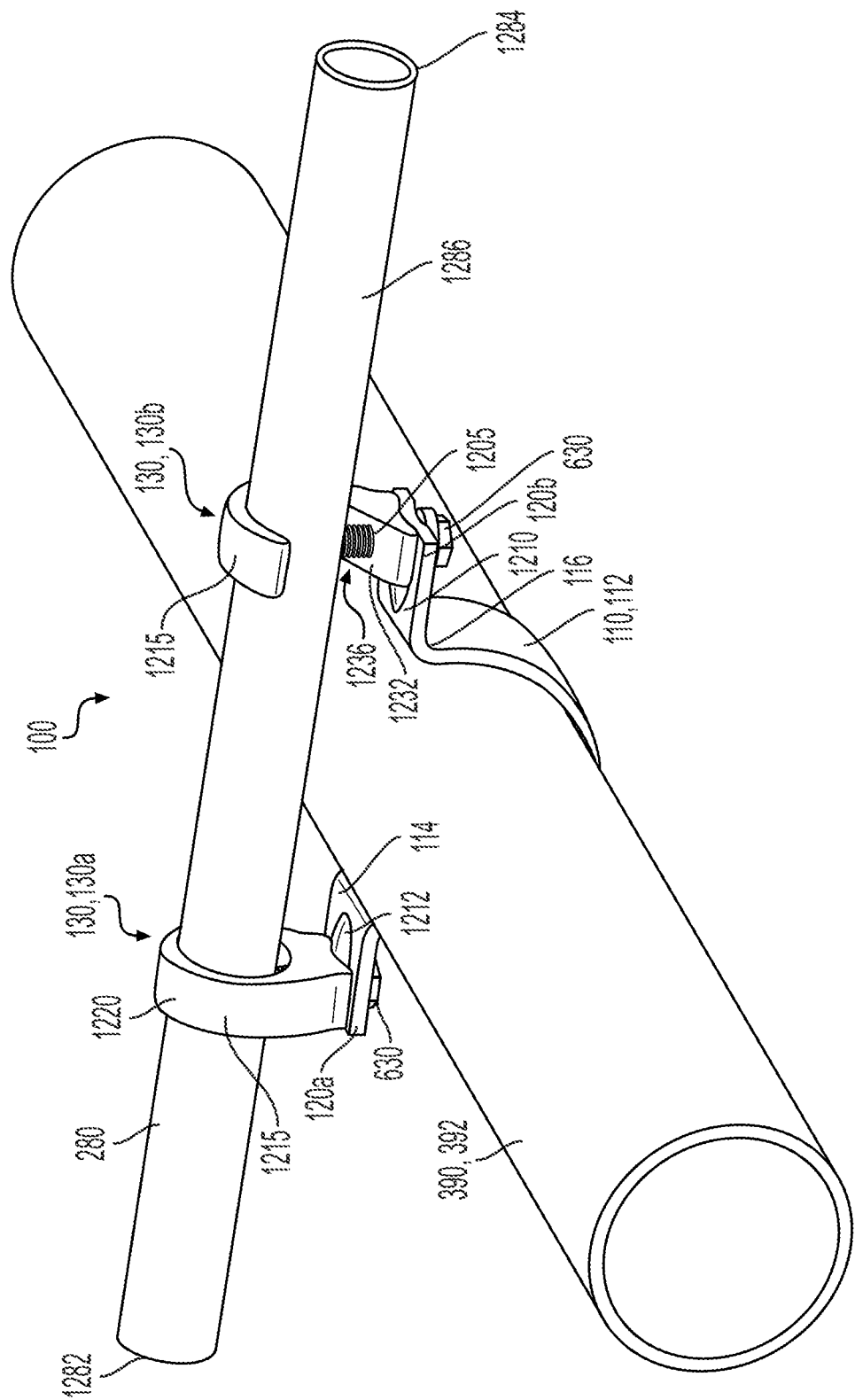
FIG. 12 illustrates a perspective view of the service pipe supported by the brace pipe attachment assembly, in accordance with another aspect of the present disclosure, the brace pipe attachment assembly further engaging the brace pipe.

FIG. 12 illustrates the brace pipe attachment assembly 100, in accordance with another aspect of the present disclosure, which can engage the piping 390 and the brace pipe 280. The brace pipe attachment assembly 100 can comprise the pipe hanger 110 and one or more of the brace pipe attachment devices 130. According to example aspects, the brace pipe attachment assembly 100 can be configured to engage the service pipe 392 to support the piping 390 above a ground surface. For example, the pipe hanger 110 can comprise the substantially U-shaped hanger strap 112 configured to cradle the service pipe 392 of the piping 390. As shown, in the present aspect, the brace pipe attachment assembly 100 can comprise the first brace pipe attachment device 130a and the second brace pipe attachment device 130b. Other aspects can comprise more or fewer of the attachment devices 130. As shown in the present view, each of the first and second attachment devices 130a,b can be secured to the brace pipe 280 in a tightened configuration. In example aspects, the brace pipe attachment devices 130 can be formed from a metal material, such as, for example and without limitation, cast iron, such as ductile iron. In other aspects, the brace pipe attachment devices 130 can be formed from any other suitable material known in the art, including, but not limited to, other metals, plastics, composites, and the like.

The hanger strap 112 can define the first end 114 and the second end 116, and the first and second hanger mounts 120a,b can extend from the first and second ends 114,116, respectively. The first attachment device 130a can be mounted to the first hanger mount 120a and the second attachment device 130b can be mounted to the second hanger mount 120b. Each of the first and second hanger mounts 120a,b can define one of the mount fastener holes 2010 (shown in FIG. 20) formed therethrough and through which a corresponding one of the fasteners 630 can extend. In some aspects, the mount fastener hole 2010 can be threaded, while in other aspects, the mount fastener hole 2010 may not be threaded. Each of the fasteners 630 can further extend through a coupling fastener hole 1205 formed through the corresponding first or second attachment device 130a,b. In some aspects, the coupling fastener hole 1205 can be threaded, while in other aspects, the coupling fastener hole 1205 may not be threaded. Furthermore, in some aspects, the brace pipe attachment assembly 100 can comprise a capturing feature configured to prevent the first and second attachment devices 130a,b from rotating relative to the pipe hanger 110. In the present aspect, an upper mount surface 1210 of either or both of the first and second hanger mounts 120a,b can be formed to substantially match the contour of a lower engagement surface 1305 (shown in FIG.

13) of the corresponding first or second attachment device 130a,b. For example, as shown, each of the first and second hanger mounts 120a,b can define a curved portion 1212 facing the corresponding first or second attachment device 130a,b and configured to match a curved profile of the corresponding lower engagement surface 1305. In example aspects, the engagement of each curved portion 1212 with the corresponding curved lower engagement surface 1305 can aid in maintaining the orientation of the first and second attachment devices 130a,b by preventing the first and second attachment devices 130a,b from rotating relative to the first and second hanger mounts 120a,b, respectively, as the fasteners 630 are tightened.

Figure 18:
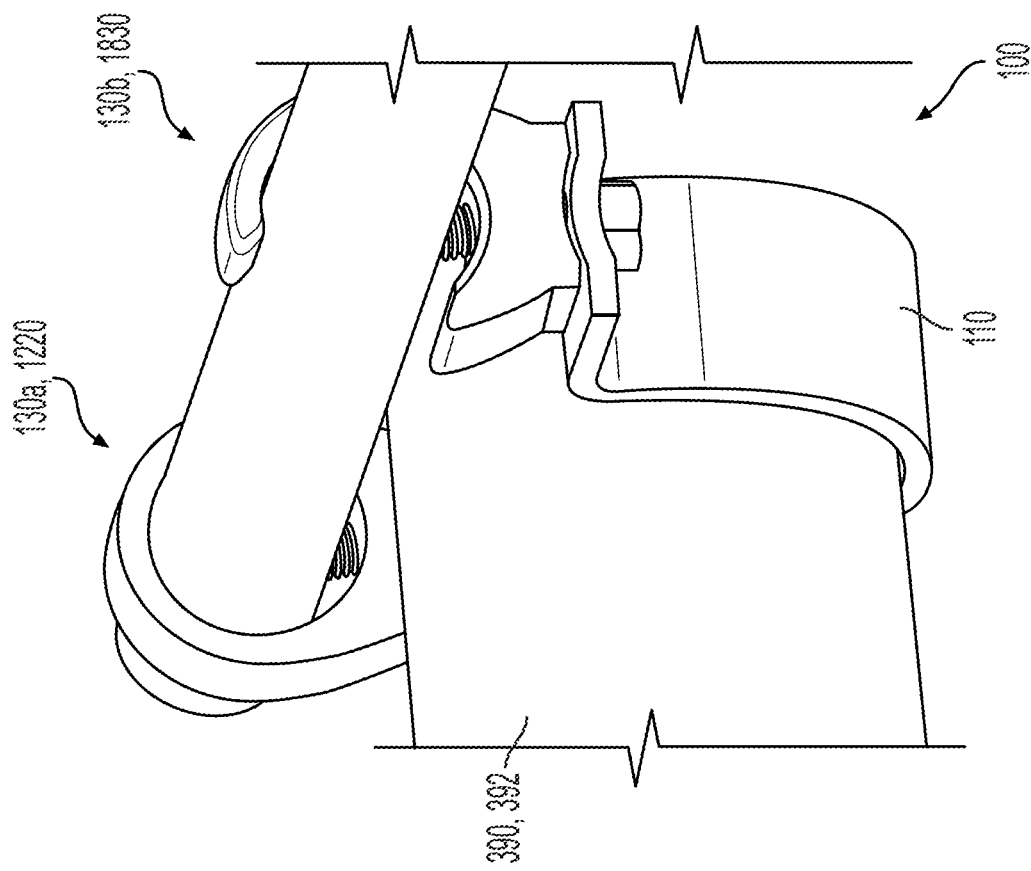
FIG. 18 illustrates a perspective view of the service pipe supported by the brace pipe attachment assembly, in accordance with another aspect of the present disclosure, the brace pipe attachment assembly further engaging the brace pipe.

Each of the first and second attachment devices 130a,b can be coupled to the brace pipe 280 to support the piping 390 therefrom. Each of the first and second attachment devices 130a,b can define an attachment device body 1215. In the present aspect, the attachment device body 1215 of the first attachment device 130a can define a closed loop structure 1220 defining a loop inner surface 1332 (shown in FIG. 13), and the loop inner surface 1332 can define a fully encircled first brace pipe channel 1330 (shown in FIG. 13) therethrough. The brace pipe 280 can extend through the first brace pipe channel 1330. Thus, to mount the first attachment device 130a onto the brace pipe 280, the closed loop structure 1220 of the first attachment device 130a can be slid over a first pipe end 1282 or a second pipe end 1284 of the brace pipe 280. Moreover, in the present aspect, the attachment device body 1215 of the second attachment device 130b can define a hook 1230 defining a hook inner surface 1232, and the hook inner surface 1232 can define a partially encircled second brace pipe channel 1440 (shown in FIG. 14). The hook 1230 can be substantially J-shaped in the present aspect. In other aspects, the hook 1230 can define any other suitable shape. For example, the hook can be substantially C-shaped, as shown in FIG. 18. The brace pipe 280 can extend through the second brace pipe channel 1440. An open hook side 1236 of the J-shaped hook 1230 can allow lateral access to the second brace pipe channel 1440. Thus, the second attachment device 130b can be mounted to the brace pipe 280 by sliding the J-shaped hook 1230 over one of the first and second pipe ends 1282,1284 of the brace pipe 280 or by laterally inserting a mid-region 1286 of the brace pipe 280 into the second brace pipe channel 1440 through the open hook side 1236 of the J-shaped hook 1230. Each of the fasteners 630 can then be tightened as described above to engage the end portion 930 (shown in FIG. 13) of the fastener 630 with the brace pipe 280.

Thus, an example method of supporting the piping 390 on the brace pipe 280 can comprise providing the brace pipe attachment assembly 100 comprising the first brace pipe attachment device 130a, the second brace pipe attachment device 130b, and the pipe hanger 110 coupled to each of the first and second brace pipe attachment devices 130a,b. The first brace pipe attachment device 130a can define the first brace pipe channel 1330 and the second brace pipe attachment device 130b can define the second brace pipe channel 1440. The method can further comprise inserting the first pipe end 1282 of the of the brace pipe 280 through the first brace pipe channel 1330, placing the pipe hanger 110 under the piping 390 to support the piping 390 thereon, and inserting the brace pipe 280 into the second brace pipe channel 1440. According to example aspects, the second brace pipe attachment device 130b can be the hook 1230, which can partially encircle the second brace pipe channel 1440 and which can define the open hook side 1236 allowing lateral access to the second brace pipe channel 1440. Thus, inserting the brace pipe 280 into the second brace pipe channel 1440 can comprise inserting the mid-region 1286 of the brace pipe 280 laterally through the open hook side 1236. In example aspects, after inserting the first pipe end 1282 through the first brace pipe channel 1330, the clearance between the brace pipe 280 and the loop inner surface 1332 of the first brace pipe attachment device 130a can allow the pipe hanger 110 and the second brace pipe attachment device 130b to be swung underneath the piping 390. The second brace pipe attachment device 130b can then be lifted upward towards the brace pipe 280 to insert the brace pipe 280 into the second brace pipe channel 1440 (e.g., laterally inserted into the second brace pipe channel 1440 through the open hook side 1236).

Figure 13:
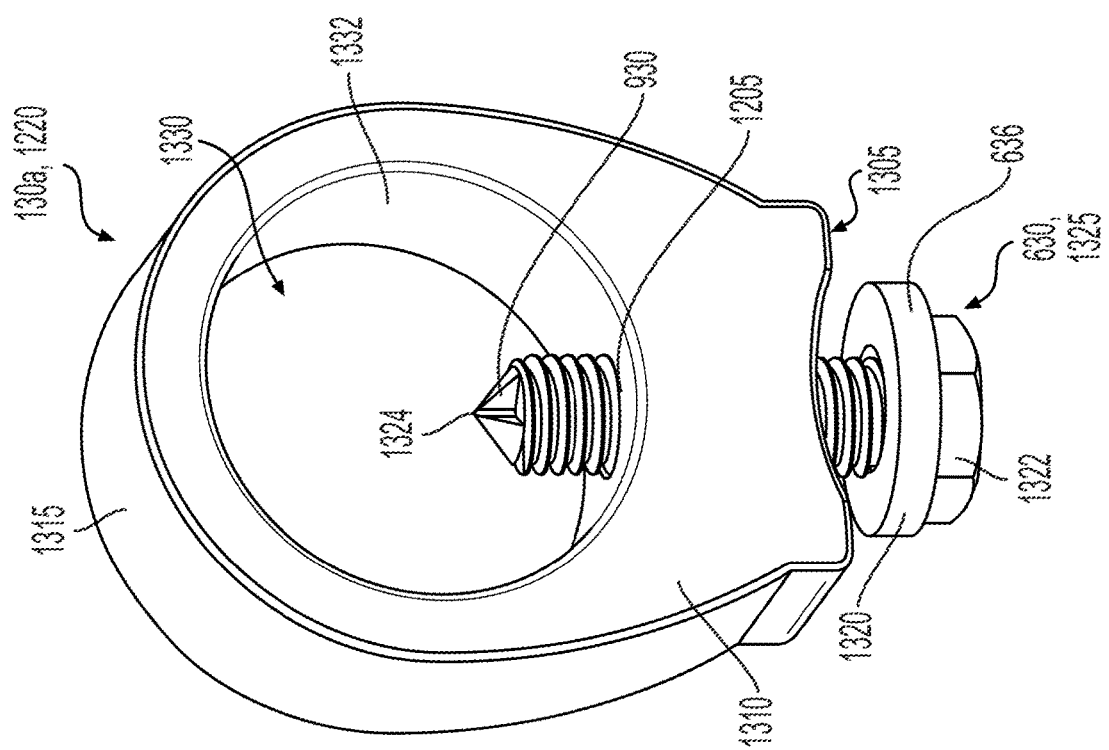
FIG. 13 illustrates a perspective view of the first brace pipe attachment device of the brace pipe attachment assembly of FIG. 12.

FIG. 13 illustrates the first attachment device 130a in accordance with an example aspect of the present disclosure. As shown, the first attachment device 130a can comprise the closed loop structure 1220, and the closed loop structure 1220 can define a base portion 1310. The base portion 1310 can define the lower engagement surface 1305, which can be configured to abut the corresponding first hanger mount 120a (shown in FIG. 12). The lower engagement surface 1305 can define a curved profile in the present aspect, which can be contoured to match the contour of corresponding curved portion 1212 (shown in FIG. 12). In other aspects, the lower engagement surface 1305 can define a different contour. The corresponding coupling fastener hole 1205 can extend through the base portion 1310 from the lower engagement surface 1305 to the first brace pipe channel 1330. In example aspects, the coupling fastener hole 1205 can be threaded and the corresponding threaded fastener 630 can rotationally engage the threaded coupling fastener hole 1205. However, in other aspects, the coupling fastener hole 1205 may not be threaded. The corresponding fastener 630 can define the head 636 and the threaded shaft 638. In the present aspect, the head 636 can define an integrated washer 1320 and a hexagonal flange 1322 extending from the integrated washer 1320. In other aspects, the washer 1320 may be formed separately from the head 636 and mounted onto the shaft 638, or no washer 1320 may be present. The shaft 638 can extend from the integrated washer 1320 and can be threaded along its length. The shaft 638 of the fastener 630 can be configured to extend through the coupling fastener hole 1205, and the end portion 930 of the fastener 630 can be disposed within the first brace pipe channel 1330, as shown. In the present aspect, the fastener 630 can be a cone point hex bolt 1325, and the end portion 930 can define a pointed end 1324. The fastener 630 can be tightened by increasingly threading the shaft 638 through the coupling fastener hole 1205 to advance the pointed end 1324 of the fastener 630 further into the first brace pipe channel 1330. As the fastener 630 is tightened, the fastener 630 can push the brace pipe 280 (shown in FIG. 12) upward relative to the orientation shown and can sandwich the brace pipe 280 between the end portion 930 of the fastener 630 and an upper loop portion 1315 of the closed loop structure 1220. The pointed end 1324 of the fastener 630 can be configured to bite into the brace pipe 280 to improve the grip of the fastener 630 on the brace pipe 280.

Figure 14:
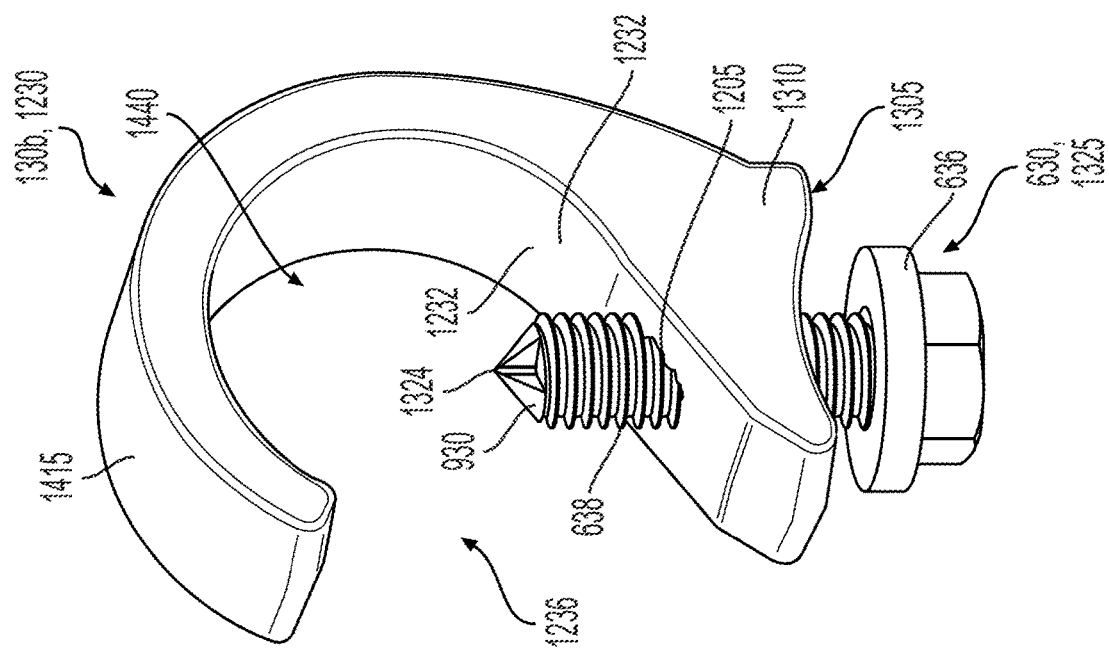
FIG. 14 illustrates a perspective view of the second brace pipe attachment device of the brace pipe attachment assembly of FIG. 12.

FIG. 14 illustrates the second attachment device 130b in accordance with an example aspect of the present disclosure. As shown, the second attachment device 130b can comprise the J-shaped hook 1230, and the J-shaped hook 1230 can define a base portion 1310. The base portion 1310 can define the lower engagement surface 1305, which can be configured to abut the corresponding second hanger mount 120b (shown in FIG. 12). The lower engagement surface 1305 can define a curved profile in the present aspect, which can be contoured to match the contour of corresponding curved portion 1212 (shown in FIG. 12). In other aspects, the lower engagement surface 1305 can define a different contour. The corresponding coupling fastener hole 1205 can extend through the base portion 1310 from the lower engagement surface 1305 to the second brace pipe channel 1440. In example aspects, the coupling fastener hole 1205 can be threaded and the corresponding threaded fastener 630 can rotationally engage the threaded coupling fastener hole 1205. In other aspects, the coupling fastener hole 1205 may not be threaded. Like the fastener 630 described above with reference to FIG. 13, the shaft 638 of the corresponding fastener 630 can be configured to extend through the coupling fastener hole 1205, and the end portion 930 of the fastener 630 can be disposed within the second brace pipe channel 1440, as shown. In the present aspect, the fastener 630 can be also a cone point hex bolt 1325, and the end portion 930 can define the pointed end 1324. When the fastener 630 is tightened, the fastener 630 can push the brace pipe 280 (shown in FIG. 12) upward relative to the orientation shown and can sandwich the brace pipe 280 between the end portion 930 of the fastener 630 and an upper hook portion 1415 of the J-shaped hook 1230. The pointed end 1324 of the fastener 630 can be configured to bite into the brace pipe 280 to improve the grip of the fastener 630 on the brace pipe 280.

Figure 15:
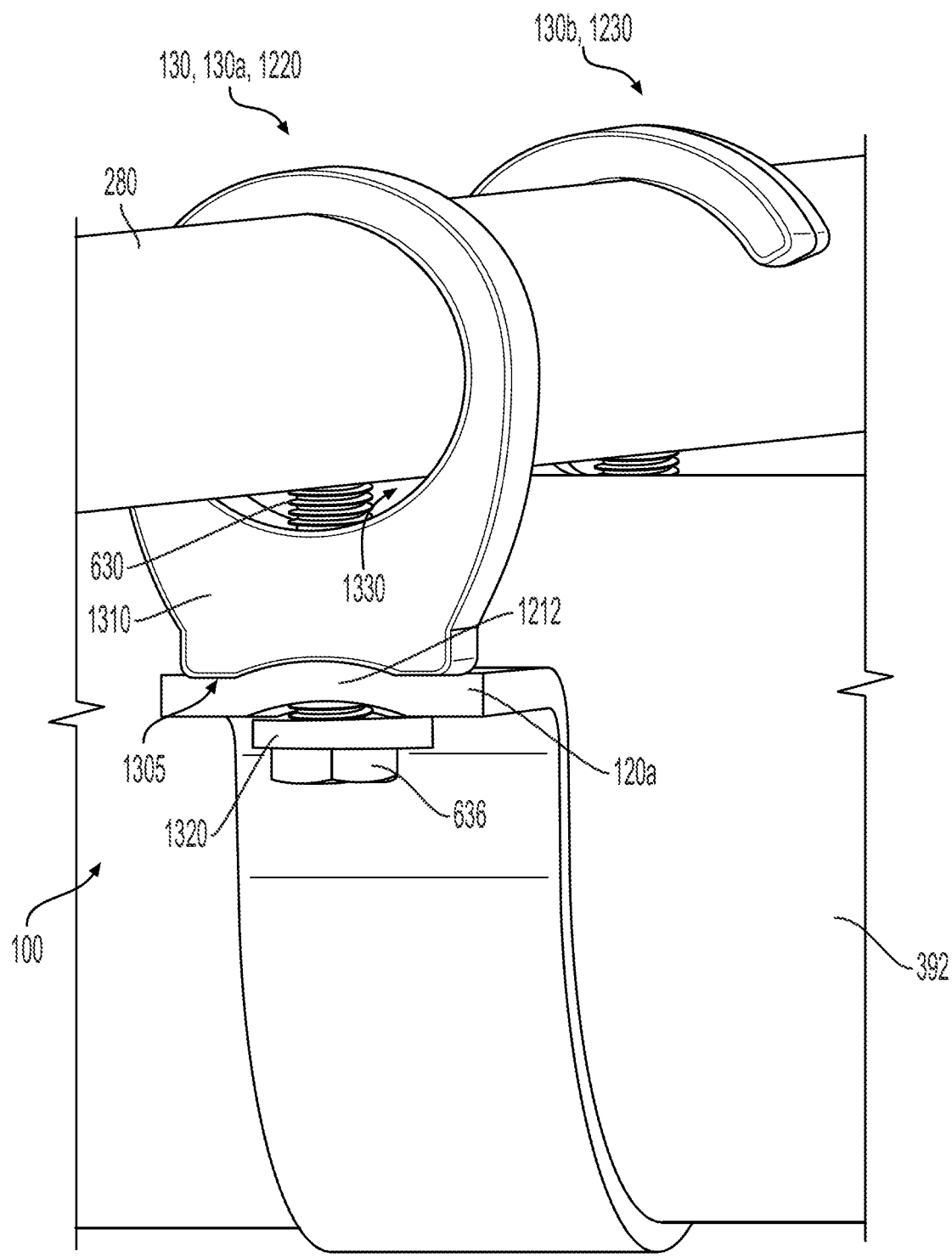
FIG. 15 illustrates a left perspective view of the brace pipe attachment assembly of FIG. 12 engaging the service pipe and the brace pipe.
Figure 16:
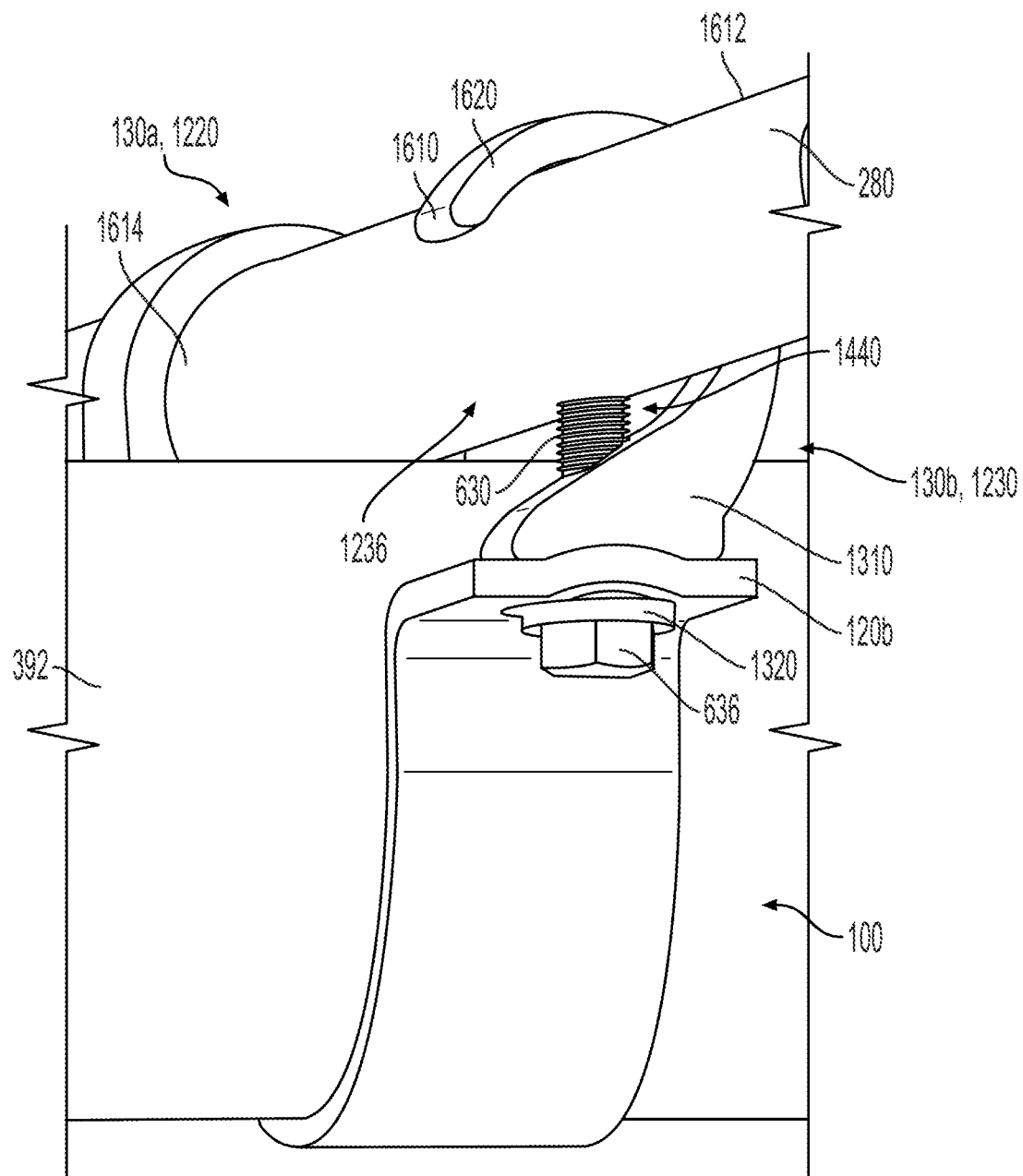
FIG. 16 illustrates a right perspective view of the brace pipe attachment assembly of FIG. 12 engaging the service pipe and the brace pipe

FIGS. 15 and 16 illustrate, respectively, left and right perspective views of the brace pipe attachment assembly 100 supporting the service pipe 392 and coupled to the brace pipe 280. With the brace pipe attachment assembly 100 and the service pipe 392 suspended by the brace pipe 280, the first and second hanger mounts 120*a,b* can bear down upon the integrated washers 1320 of the corresponding fasteners 630. According to example aspects, the first and second attachment devices 130*a,b* can be configured to accommodate brace pipes 280 of varying sizes. In the aspect shown, the brace pipe 280 can define an average-sized diameter. When the fasteners 630 are tightened against the brace pipe 280, a clearance can be provided between the brace pipe 280 and the base portion 1310 of each attachment device 130, as illustrated, and thus, the first and second brace pipe channels 1330,1440 can be sized such that a brace pipe 280 having a larger diameter could be received through the first and second brace pipe channels 1330,1440. Furthermore, the fasteners 630 can define a suitable length/size for accommodating a brace pipe 280 having a smaller diameter. That is, the fasteners 630 can be configured to advance far enough into the corresponding first and second brace pipe channels 1330,1440 to push a small-diameter brace pipe 280 upward against the corresponding first and second attachment devices 130*a,b*, respectively. Additionally, FIGS. 15 and 16 illustrate the lower engagement surfaces 1305 of the first and second attachment devices 130*a,b* contacting the corresponding curved portions 1212 of the first and second hanger mounts 120*a,b*. The contour of the lower engagement surfaces 1305 can substantially match the contour of the curved portions 1212, and the curved portions 1212 can prevent the rotation of the first and second attachment devices 130*a,b* relative to the hanger mounts 120*a,b*. Preventing rotation of the attachment devices 130 can be particularly beneficial when tightening the fasteners 630 within the coupling fastener holes 1205 (shown in FIG. 12).

Referring to FIG. 16, the J-shaped hook 1230 can wrap around a rear side (not shown) of the brace pipe 280, over a top end 1612 of the brace pipe 280, and partially around a front side 1614 of the brace pipe 280. As shown, the J-shaped hook 1230 can define an arcuate retaining portion 1620 extending from the upper hook portion 1415 to a distal end 1610 of the J-shaped hook 1230. The arcuate retaining portion 1620 can wrap partially around the front side 1614 of the brace pipe 280 towards the open hook side 1236. According to example aspects, the arcuate retaining portion 1620 can aid in retaining the brace pipe 280 within the second brace pipe channel 1440. Specifically, the arcuate retaining portion 1620 can prevent the brace pipe 280 from slipping out of the second brace pipe channel 1440 through the open hook side 1236, which can be particularly important during movement of the brace pipe 280 and/or the brace pipe attachment assembly, such as during a seismic event.

Figure 17:
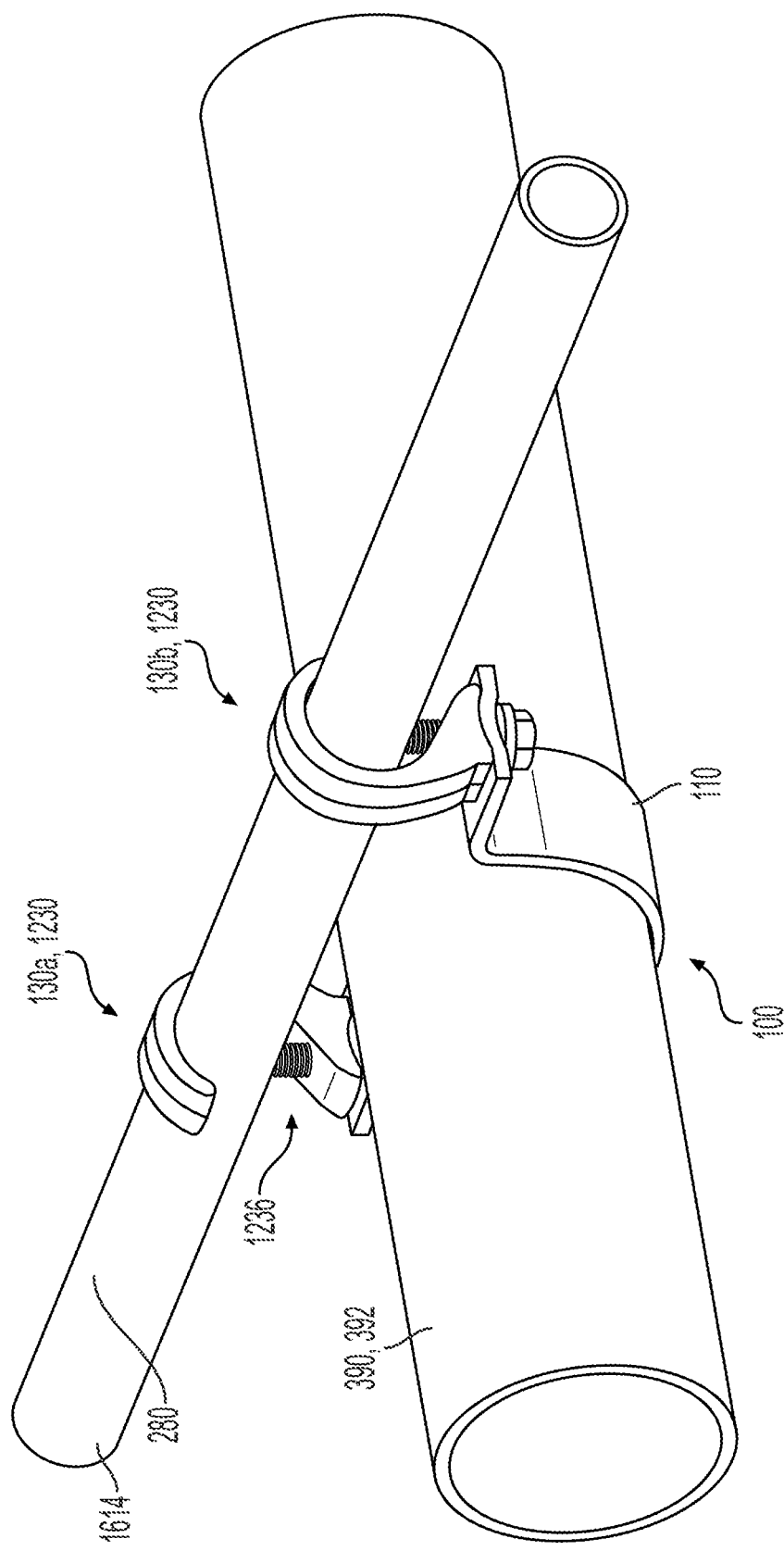
FIG. 17 illustrates a perspective view of the service pipe supported by the brace pipe attachment assembly, in accordance with another aspect of the present disclosure, the brace pipe attachment assembly further engaging the brace pipe.

FIG. 17 illustrates the brace pipe attachment assembly 100 in accordance with another aspect of the present disclosure. The brace pipe attachment assembly 100 can support the service pipe 392 on the pipe hanger 110, and the first and second attachment devices 130*a,b* can couple the brace pipe attachment assembly 100 to the brace pipe 280. The brace pipe attachment assembly 100 of the present aspect can be similar to the brace pipe attachment assembly 100 of FIGS. 12-16. However, as shown, in the present aspect, each of the first and second attachment devices 130*a,b* can be formed as the J-shaped hook 1230. The first attachment device 130*a* can be forward-facing, such that the open hook side 1236 thereof can be oriented at the front side 1614 of the brace pipe 280, and the second attachment device 130*b* can be rearward-facing, such that the open hook side 1236 thereof can be disposed at the rear side of the brace pipe 280. In other aspects, however, both of the first and second attachment devices 130*a,b* may face in the same direction. In the present aspect, the brace pipe attachment assembly 100 can be installed with the piping 390 and the brace pipe 280 from below the piping 390. The pipe hanger 110 can be placed underneath the piping 390 to support the piping 390 thereon, and the brace pipe 280 can be inserted laterally into each of the first and second brace pipe channels 1330,1440 through the corresponding open hook sides 1236 of the first and second attachment devices 130*a,b*.

Figure 19:
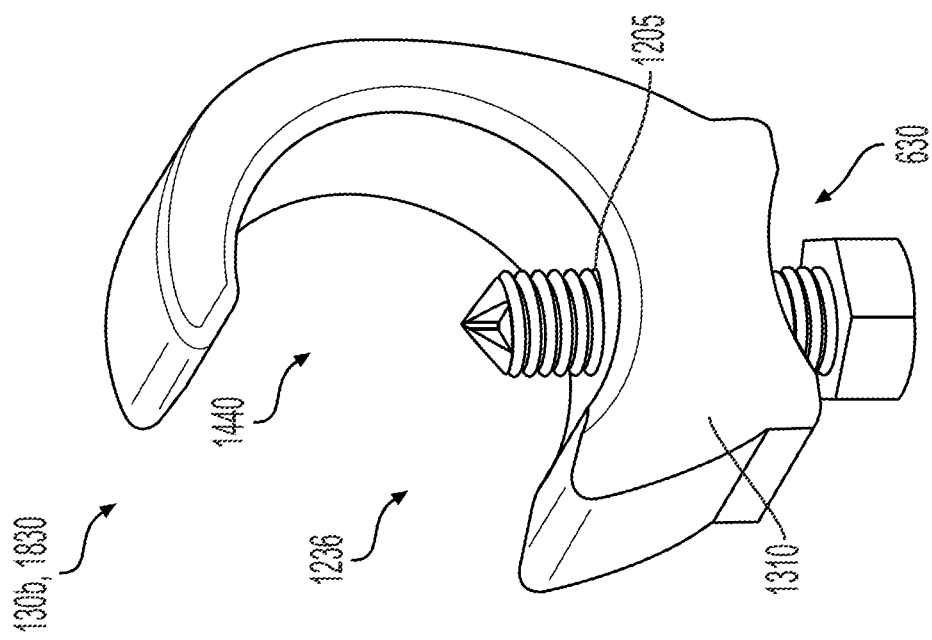
FIG. 19 illustrates a perspective view of the second brace pipe attachment device of FIG. 19.

FIG. 18 illustrates the brace pipe attachment assembly 100 in accordance with another aspect of the present disclosure. The brace pipe attachment assembly 100 can support the service pipe 392 on the pipe hanger 110, and the first and second attachment devices 130*a,b* can couple the brace pipe attachment assembly 100 to the brace pipe 280. The brace pipe attachment assembly 100 of the present aspect can be similar to the brace pipe attachment assembly 100 of FIGS. 12-16. However, in the present aspect, the second attachment device 130*b* can be a substantially C-shaped hook 1830, as opposed to the J-shaped hook 1230 (shown in FIG. 12.) FIG. 19 illustrates the C-shaped hook 1830 with the fastener 630 extending through the coupling fastener hole 1205 of the base portion 1310 and into the second brace pipe channel 1440.

Figure 20:
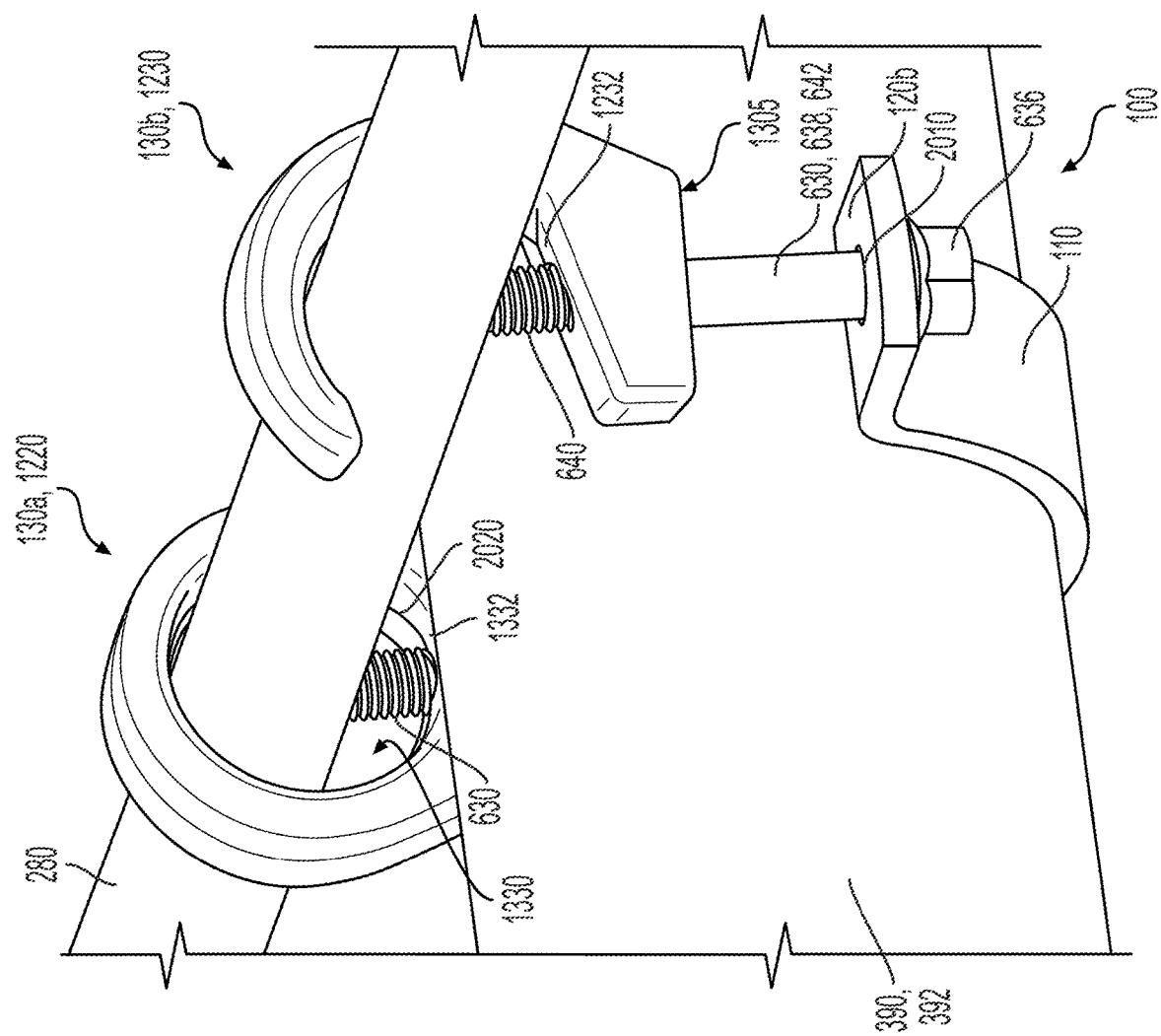
FIG. 20 illustrates a perspective view of the service pipe supported by the brace pipe attachment assembly, in accordance with another aspect of the present disclosure, the brace pipe attachment assembly further engaging the brace pipe.

FIG. 20 illustrates the brace pipe attachment assembly 100 in accordance with another aspect of the present disclosure. The brace pipe attachment assembly 100 can support the service pipe 392 on the pipe hanger 110, and the first and second attachment devices 130*a,b* can couple the brace pipe attachment assembly 100 to the brace pipe 280. The first attachment device 130*a* can define the closed loop structure 1220 and can be similar to the first attachment device 130*a* shown in FIGS. 12-16. The second attachment device 130*b* can define the J-shaped hook 1230 and can be similar to the second coupled device 130*b* shown in FIGS. 12-16. However, in the present aspect, the lower engagement surfaces 1305 of the first and second attachment devices 130a,b can be substantially planar, and the first and second hanger mounts 120a,b (120a shown in FIG. 24) of the pipe hanger 110 can be substantially planar. Additionally, in the present aspect, the service pipe 392 can define a large diameter, and the fasteners 630 can be elongated to accommodate the large-diameter service pipe 392. In the present aspect, the shaft 638 of each fastener 630 can define the threaded portion 640 and the unthreaded portion 642, wherein the unthreaded portion 642 can be elongated and can extend between the head 636 of the fastener 630 and the threaded portion 640. The shaft 638 of each of the fasteners 630 can further define the pointed end 1324 (shown in FIG. 24) at the end portion 930 (shown in FIG. 24) thereof. In example aspects, the loop inner surface 1332 of the loop structure 1220 can define a pointed loop gripping edge 2020 configured to bite into the brace pipe 280, and the hook inner surface 1232 of the J-shaped hook 1230 can define a pointed hook gripping edge 2230 (shown in FIG. 22) configured to bite into the brace pipe 280, thus allowing an improved grip of the first and second attachment devices 130a,b on the brace pipe 280. The loop gripping edge 2020 and the hook gripping edge 2230 are described in further detail with respect to FIGS. 21 and 22.

Figure 22:
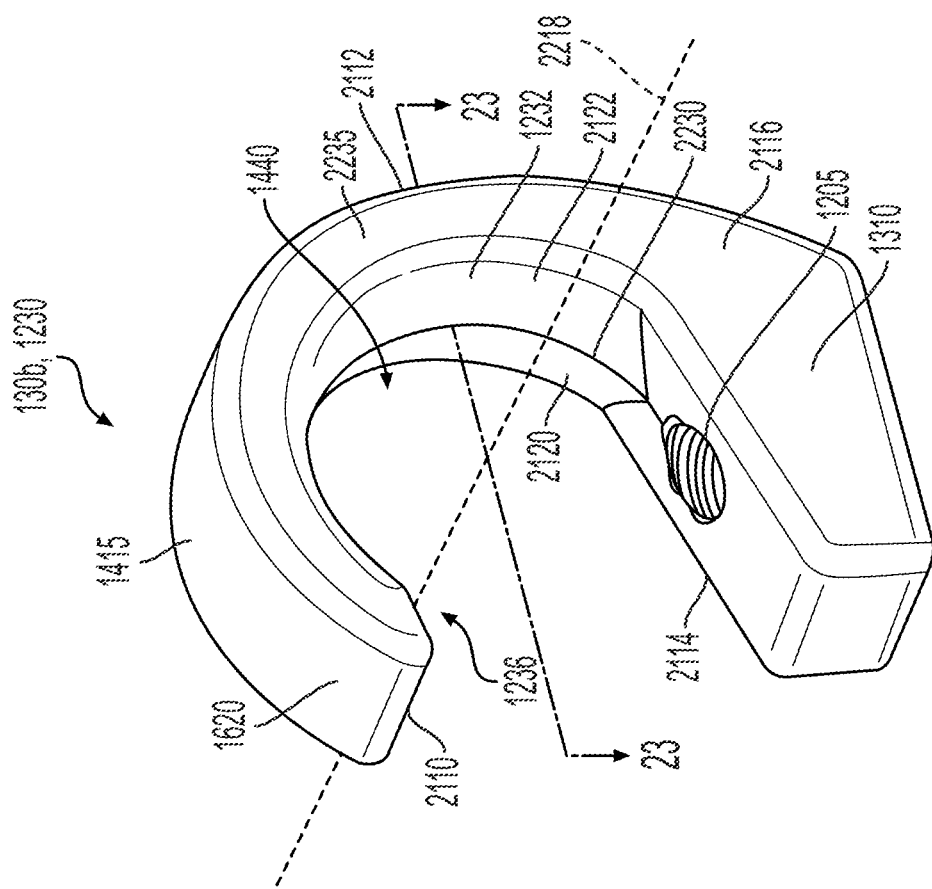
FIG. 22 illustrates a perspective view of the second brace pipe attachment device of the brace pipe attachment assembly of FIG. 20.
Figure 21:
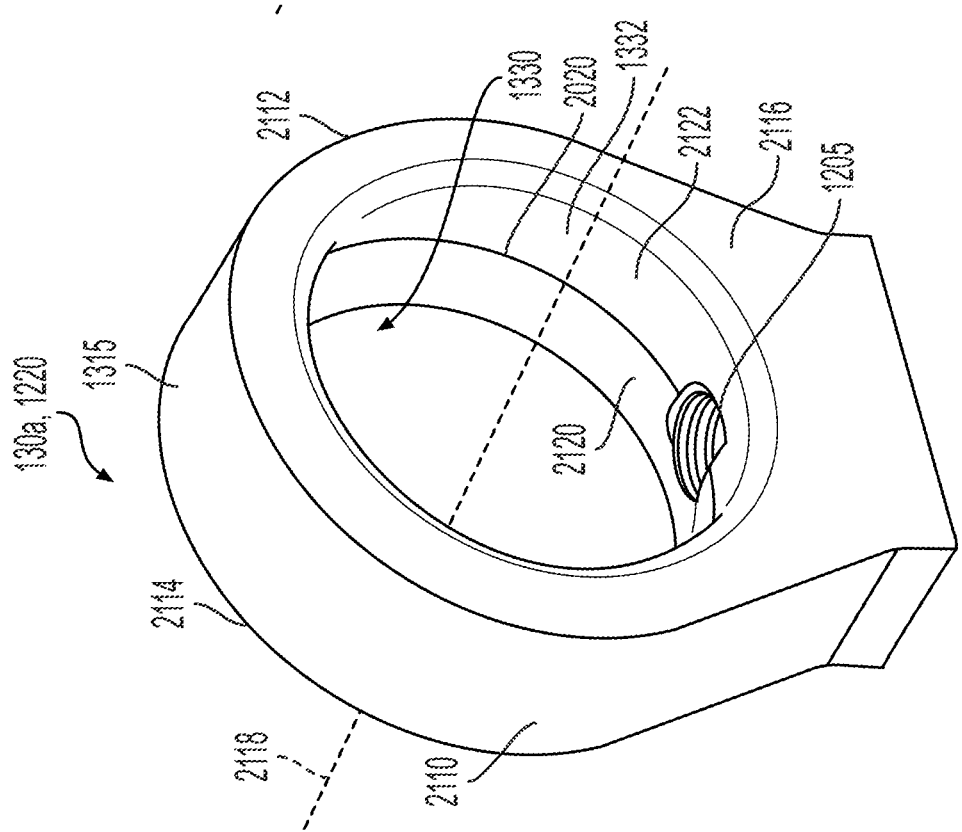
FIG. 21 illustrates a perspective view of the first brace pipe attachment device of the brace pipe attachment assembly of FIG. 20.

FIGS. 21 and 22 illustrate the first attachment device 130a and the second attachment device 130b, respectively. Each of the first attachment device 130a and the second attachment device 130b can define a front side 2110, a rear side 2112 opposite the front side 2110, a first lateral end 2114, and a second lateral end 2116 opposite the first lateral end 2114. Each of the first and second brace pipe channel 1330,1440 can extend from the corresponding first lateral end 2114 to the corresponding second lateral end 2116. The open hook side 1236 of the second attachment device 130b can be defined at the corresponding front side 2110.

Referring to FIG. 21, according to example aspects, the loop inner surface 1332 can define a first tapered portion 2120 tapering radially inward, relative to a loop axis 2118, from the first lateral end 2114 towards the second lateral end 2116 and a second tapered portion 2122 tapering radially inward, relative to the loop axis 2118, from the second lateral end 2116 towards the first lateral end 2114. The first tapered portion 2120 can meet the second tapered portion 2122 at the loop gripping edge 2020, as shown. In example aspects, the loop gripping edge 2020 can be oriented about centrally between the first and second lateral ends 2114, 2116. The loop gripping edge 2020 can extend at least partially around the first brace pipe channel 1330. For example, in the present aspect, the loop gripping edge 2020 can extend fully around the first brace pipe channel 1330. In other aspects, however, the loop gripping edge 2020 may not extend fully around the first brace pipe channel 1330. For example, in other aspects, the loop gripping edge 2020 may extend along the upper loop portion 1315 of the loop structure 1220 only.

Figure 23:
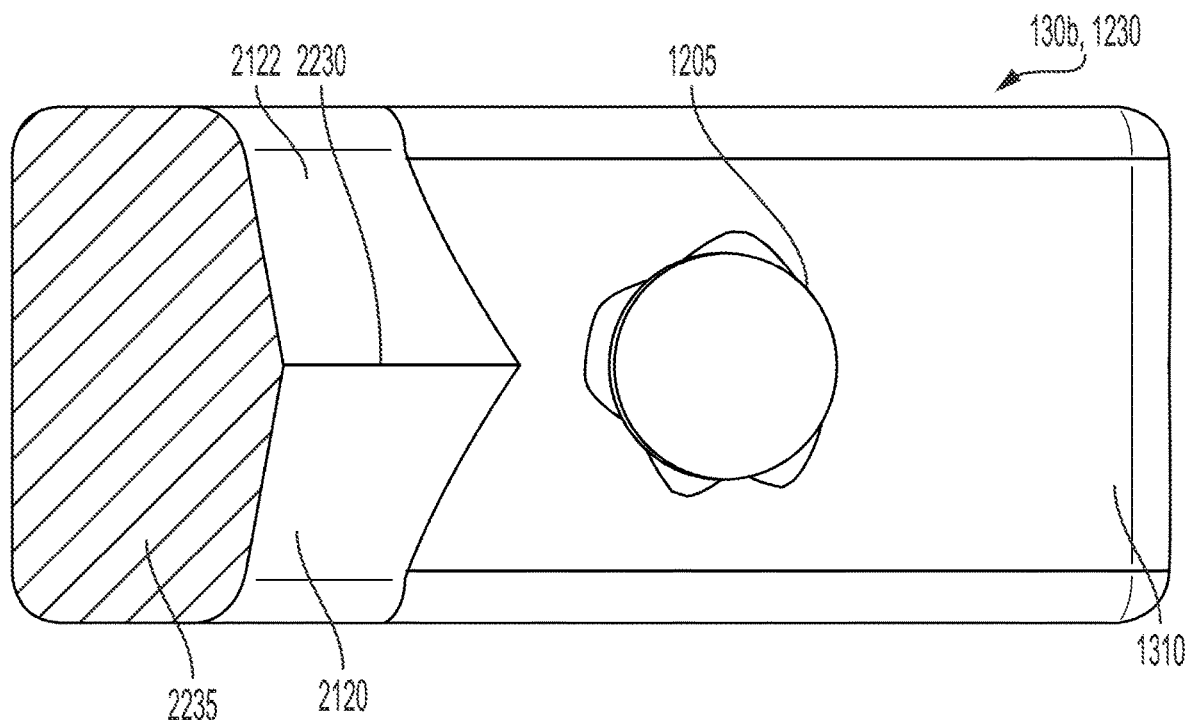
FIG. 23 illustrates a cross-sectional view of the second brace pipe attachment device taken along line 23-23 in FIG. 22.

Referring to FIG. 22, according to example aspects, the hook inner surface 1232 of the J-shaped hook 1230 can also define the first tapered portion 2120 tapering radially inward, relative to a hook axis 2218, from the first lateral end 2114 towards the second lateral end 2116 and the second tapered portion 2122 tapering radially inward, relative to the hook axis 2218, from the second lateral end 2116 towards the first lateral end 2114. The first tapered portion 2120 can meet the second tapered portion 2122 at the hook gripping edge 2230, as shown. In example aspects, the hook gripping edge 2230 can be oriented about centrally between the first and second lateral ends 2114,2116 and can extend partially around the second brace pipe channel 1440. In the present aspect, the hook gripping edge 2230 can extend substantially along the arcuate retaining portion 1620, the upper hook portion 1415, and a rear hook portion 2235 disposed at the rear side 2112 of the J-shaped hook 1230, opposite the open hook side 1236. However, the hook gripping edge 2230 does not extend along the base portion 1310. In other aspects, however, the hook gripping edge 2230 may extend along varying portions of the J-shaped hook 1230. For example, in another aspect, the hook gripping edge 2230 can extend along the base portion 1310, and in another aspect, the hook gripping edge 2230 can extend along the upper hook portion 1415 only. FIG. 23 illustrates a cross-sectional view of the J-shaped hook 1230 taken along line 23-23 in FIG. 22.

Figure 24:
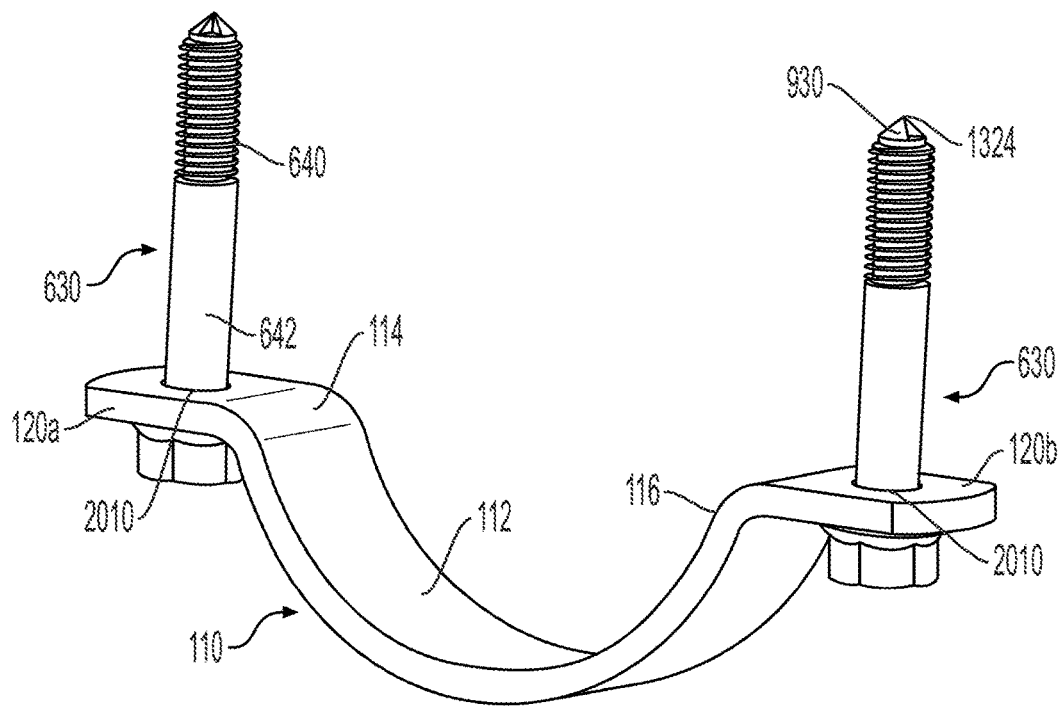
FIG. 24 illustrates a perspective view of the pipe hanger of the brace pipe attachment assembly of FIG. 20.

FIG. 24 illustrates the pipe hanger 110 in accordance with an example aspect of the present disclosure. The pipe hanger 110 can comprise the substantially U-shaped hanger strap 112, and the hanger strap 112 can define the first end 114 and the second end 116. The first and second hanger mounts 120a,b can extend from the first and second ends 114,116 of the hanger strap 112, respectively. Each of the first and second hanger mounts 120a,b can define one of the mount fastener holes 2010 therethrough, and a corresponding one of the elongated fasteners 630 can extend therethrough.

Figure 25:
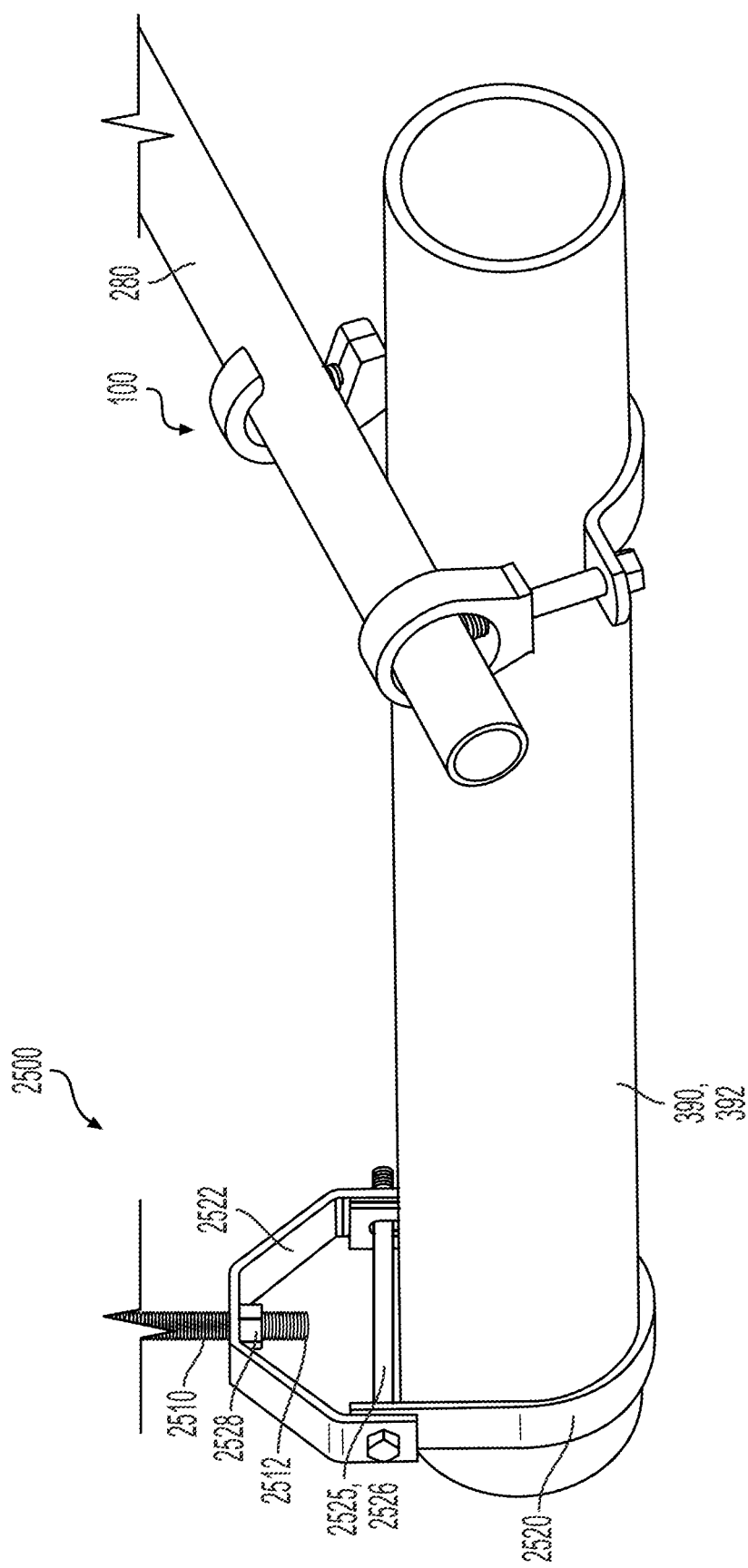
FIG. 25 illustrates the service pipe further supported by a second attachment assembly.

FIG. 25 illustrates the piping 390 supported on the brace pipe attachment assembly 100 and further support on a second attachment assembly, wherein the second attachment assembly can be a clevis-type hanger 2500. In other aspects, the second attachment assembly can be any other suitable type of piping hanger known in the art. According to example aspects, the service pipe 392 can be supported on the brace pipe attachment assembly 100, which can be coupled to and suspended from the brace pipe 280, as described above. The service pipe 392 can further be supported on the clevis-type hanger 2500. Example aspects of the clevis-type hanger 2500 can comprise a substantially vertical support rod 2510. The clevis-type hanger 2500 can comprise a substantially U-shaped lower hanger member 2520 configured to cradle the piping 390, as shown. An upper hanger member 2522 can be fastened to the lower hanger member 2520 by a hanger fastener 2525, such as, for example, a nut and bolt assembly 2526, screw, rivet, or any other suitable fastener known in the art. A lower end 2512 of the support rod 2510 can extend through a hanger opening (not shown) in the upper hanger member 2522 and can be secured to the upper hanger member 2522. In the present aspect, the lower end 2512 of the support rod 2510 can be threaded, and a threaded nut 2528 can be threaded onto the lower end 2512. The threaded nut 2528 can prohibit the support rod 2510 from disengaging the hanger opening, and the upper hanger member 2522 can bear down on the threaded nut 2528 to support the piping 390 thereon. In other aspects, the support rod 2510 can be secured to the upper hanger member 2522 by any other suitable fastener or fastening technique known in the art.

Figure 26:
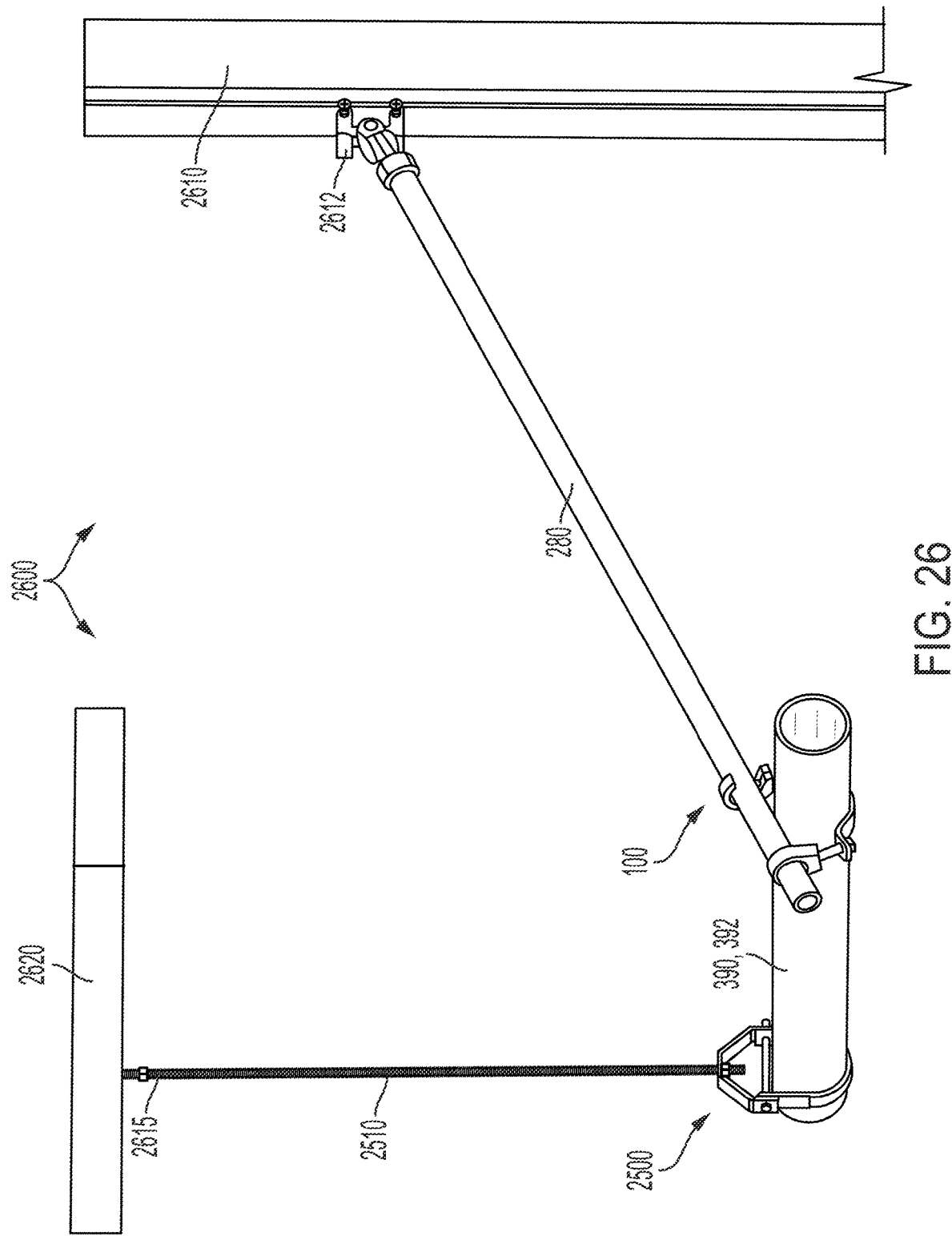
FIG. 26 illustrates the service pipe supported by a building structure.

FIG. 26 illustrates the piping 390 supported from a building structure 2600. As shown, the service pipe 392 can be supported on the brace pipe attachment assembly 100, which can be coupled to and suspended from the brace pipe 280, as described above. As shown, the brace pipe 280 can further be coupled to the building structure 2600. For example, in the present aspect, the brace pipe 280 can be coupled to a substantially vertical support beam 2610 of the building structure 2600. The brace pipe 280 can be coupled to the support beam 2610 by a coupling bracket 2612, as shown, or by any other suitable fastener or fastening technique known in the art. In other aspects, the brace pipe 280 can be directly or indirectly coupled to a wall, a ceiling, or any other suitable support component of the building structure 2600. The clevis-type hanger 2500 can also be coupled to the building structure 2600. For example, in the present aspect, an upper end 2615 of the support rod 2510 of the clevis-type hanger 2500 can be coupled to a substantially horizontal ceiling slab 2620 of the building structure 2600. According to example aspects, the support rod 2510 can be coupled to the ceiling slab 2620 by, for example, a fastener site or a welded site. For example and without limitation, if the ceiling slab 2620 comprises metal, the support rod 2510 may be welded to the ceiling slab 2620. If the ceiling slab 2620 comprises concrete, the support rod 2510 may be coupled to the ceiling slab 2620 by a concrete anchor bolt. If the ceiling slab 2620 comprises wood, the support rod 2510 may be coupled to the ceiling slab 2620 by a wood mounting plate. In other aspects, the support rod 2510 can be coupled to the ceiling slab 2620 by any other suitable fastener or fastening technique known in the art. In other aspects, the clevis-type hanger 2500 can be coupled to a ceiling insert, wall, support beam, or any other suitable support component of the building structure 2600.

Figure 27:
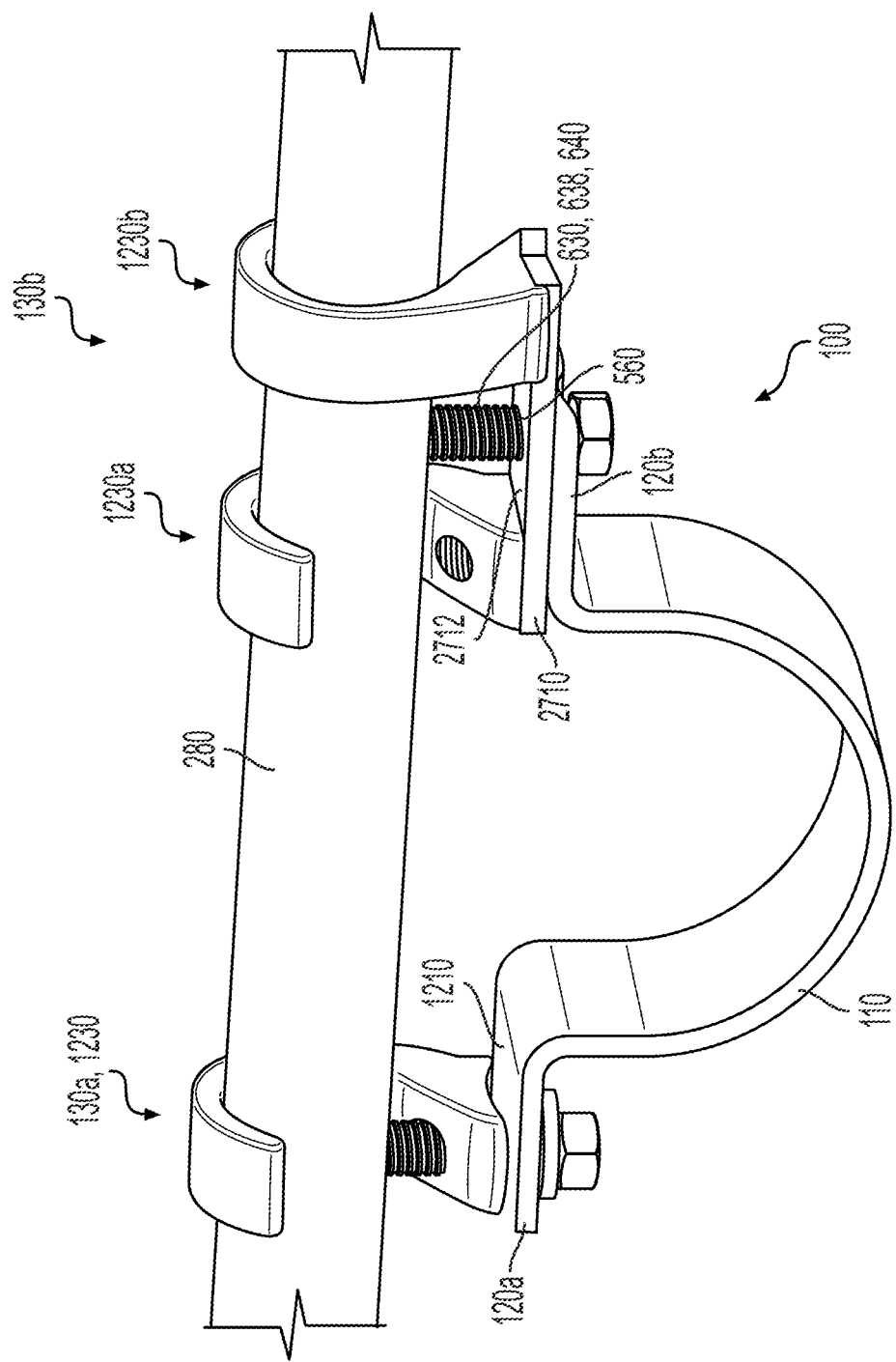
FIG. 27 illustrates the brace pipe attachment assembly in accordance with another aspect of the present disclosure.

FIG. 27 illustrates the brace pipe attachment assembly 100 in accordance with another aspect of the present disclosure. The brace pipe attachment assembly 100 can be configured to support the service pipe 392 (shown in FIG. 3) on the pipe hanger 110, and the first and second attachment devices 130*a,b* can couple the brace pipe attachment assembly 100 to the brace pipe 280. The first attachment device 130*a* can be formed as the J-shaped hook 1230 and can face in the forward direction, relative to the orientation. In other aspects, the first attachment device 130*a* can face in the rearward direction. In other aspects, the first attachment device 130*a* can be the closed loop structure 1220 (shown in FIG. 12). The second attachment device 130*b* can comprise a pair of the J-shaped hooks 1230*a,b*. A base plate 2710, similar to the base member 540 (shown in FIG. 5), can be configured to abut the upper mount surface 1210 of the second hanger mount 120*b*. The base plate 2710 can define the base fastener hole 560, which can be aligned with the mount fastener hole 2010 (shown in FIG. 20) of the second hanger mount 120*b*. The fastener 630 can extend through each of the mount fastener hole 2010 and the base fastener hole 560. The base fastener hole 560 can be threaded in example aspects, and the threaded portion 640 of the fastener 630 can rotationally engage the threaded base fastener hole 560. The fastener 630 can be tightened within the base fastener hole 560 to press the end portion 930 (shown in FIG. 9) of the shaft 638 into the brace pipe 280. Each of the J-shaped hooks 1230*a,b* of the second attachment device 130*b* can be mounted to an upper surface 2712 of the base plate 2710. In some aspects, the J-shaped hooks 1230*a,b* can be coupled to the base plate 2710 by welding, adhesive, screws, bolts, rivets, or by any other suitable fastener or fastening technique known in the art. In example aspects, the J-shaped hooks 1230*a,b* can face in opposing directions. For example, the J-shaped hook 1230*a* can be forward-facing, and the J-shaped hook 1230*b* can be rear-facing, relative to the orientation shown. In other aspects, the pair of J-shaped hooks 1230*a,b* can face in a common direction.

One should note that conditional language, such as, among others, "can," "could," "might," or "may," unless specifically stated otherwise, or otherwise understood within the context as used, is generally intended to convey that certain embodiments include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A brace pipe attachment mechanism comprising:
    a hook member comprising a hook and defining a first fastener hole, and further comprising a hook support plate defining a top surface;
    a base member comprising a base support plate that confronts the top surface of the hook support plate and defining a second fastener hole aligned with the first fastener hole, wherein the hook member is rotatable relative to the base member between a first position and a second position, the first fastener hole being defined through the hook support plate and the hook extends upward from the hook support plate; and
    a fastener extending through the first fastener hole and the second fastener hole and configured to engage a brace pipe, wherein the hook member is rotatable about the fastener.

2. The brace pipe attachment mechanism of claim 1, wherein:
    the hook defines a leg and an arm coupled to the leg at a proximal arm end;
    the leg is substantially perpendicular to and extends from the hook support plate; and
    the arm is substantially parallel with and extends from the leg distal to the hook support plate.

3. The brace pipe attachment mechanism of claim 2, wherein the hook defines a gusset formed at a joint between the arm and the leg, and wherein the gusset extends towards the hook support plate.

4. The brace pipe attachment mechanism of claim 3, wherein:
    the gusset defines a substantially triangular shape; and
    the gusset defines a sharp outer edge configured to dig into an outer surf ace of the brace pipe.

5. The brace pipe attachment mechanism of claim 2, wherein the hook further defines a tab extending from a distal arm end of the arm opposite the proximal arm end, and wherein the tab is substantially parallel with the leg and extends towards the hook support plate.

6. The brace pipe attachment mechanism of claim 5, wherein the tab defines a pointed tab end distal to the distal arm end, and wherein the pointed tab end is configured to dig into an outer surface of the brace pipe.

7. The brace pipe attachment mechanism of claim 1, wherein:
the base support plate of the base member defines a base plate first side and a base plate second side opposite the base plate first side;
the hook support plate of the hook member defines a hook plate first side and a hook plate second side opposite the hook plate first side; and
the base member further comprises a first stopper extending from the base plate first side and configured to engage the hook plate first side to limit rotation of the hook member about the fastener.

8. The brace pipe attachment mechanism of claim 7, wherein:
the base member further comprises a second stopper extending from the base plate second side and configured to engage the hook plate second side to further limit the rotation of the hook member about the fastener;
the base support plate further defines a base plate first end and a base plate second end opposite the base plate first end; and
the first stopper is formed proximate to the base plate first end, and the second stopper is formed proximate to the base plate second end.

9. The brace pipe attachment mechanism of claim 7, wherein the second fastener hole of the base member defines internal threading, and wherein the fastener defines a threaded portion configured to engage the internal threading of the second fastener hole to couple the hook member to the base member.

10. The brace pipe attachment mechanism of claim 1, wherein:
the hook support plate of the hook member defines a hook plate first side, a hook plate second side opposite the hook plate first side;
the hook is a first hook extending from the hook plate first side and facing the hook plate second side;
the hook member further comprises a second hook extending from the hook plate second side and facing the hook plate first side; and
the first hook and the second hook are substantially the same in size and shape.

11. The brace pipe attachment mechanism of claim 10, wherein:
the hook support plate further defines a hook plate first end and a hook plate second end opposite the hook plate first end; and
the first hook is formed proximate to the hook plate second end, and the second hook is formed proximate to the hook plate first end.

12. A brace pipe attachment assembly comprising:
a pipe hanger configured to cradle piping thereon, the pipe hanger defining a hanger mount, the hanger mount defining a mount fastener hole;
a brace pipe attachment device comprising a hook member, wherein the hook member comprises a hook, a hook support plate, and a base member comprising a base support plate, the brace pipe attachment device defining a first fastener hole aligned with the mount fastener hole, wherein the hook member is rotatable relative to the hanger mount between a first position and a second position, wherein the first fastener hole is defined through the hook support plate and the hook extends upward from the hook support plate and away from the hanger mount, and wherein the hook support plate is disposed between the base support plate and the hanger mount; and
a fastener extending through the first fastener hole, through a second fastener hole formed in the base support plate, and through the mount fastener hole, and configured to engage a brace pipe, wherein the hook member is rotatable about the fastener.

13. The brace pipe attachment assembly of claim 10, wherein the hook defines a leg and an arm coupled to the leg at a proximal arm end;
the leg is substantially perpendicular to and extends from the hook support plate; and
the arm is substantially parallel with and extends from the leg distal to the hook support plate.

14. The brace pipe attachment assembly of claim 13, wherein:
the hook defines a gusset formed at a joint between the arm and the leg;
the gusset extends towards the hook support plate; and
the gusset defines a sharp outer edge configured to dig into an outer surf ace of the brace pipe.

15. The brace pipe attachment assembly of claim 13, wherein the hook further defines a tab extending from a distal arm end of the arm opposite the proximal arm end, and wherein the tab is substantially parallel with the leg and extends towards the hook support plate.

16. The brace pipe attachment assembly of claim 15, wherein the tab defines a pointed tab end distal to the distal arm end, and wherein the pointed tab end is configured to dig into an outer surface of the brace pipe.

17. The brace pipe attachment device of claim 12, wherein:
the base support plate of the base member defines a base plate first side and a base plate second side opposite the base plate first side;
the hook support plate of the hook member defines a hook plate first side and a hook plate second side opposite the hook plate first side; and
the base member further comprises a first stopper extending from the base plate first side and configured to engage the hook plate first side to limit rotation of the hook member about the fastener.

18. The brace pipe attachment device of claim 12, wherein:
the hook support plate of the hook member defines a hook plate first side, a hook plate second side opposite the hook plate first side;
the hook is a first hook extending from the hook plate first side and facing the hook plate second side;
the hook member further comprises a second hook extending from the hook plate second side and facing the hook plate first side; and
the first hook and the second hook are substantially the same in size and shape.

* * * * *